United States Patent
Kuroki et al.

(10) Patent No.: US 8,630,511 B2
(45) Date of Patent: Jan. 14, 2014

(54) IMAGE PROCESSING APPARATUS AND METHOD FOR IMAGE RESIZING MATCHING DATA SUPPLY SPEED

(75) Inventors: Kenichiro Kuroki, Kawasaki (JP); Toshio Kudo, Kawasaki (JP)

(73) Assignee: Spansion LLC, Sunnyvale, CA (US)

( * ) Notice: Subject to any disclaimer, the term of this patent is extended or adjusted under 35 U.S.C. 154(b) by 1471 days.

(21) Appl. No.: 11/520,778

(22) Filed: Sep. 14, 2006

(65) Prior Publication Data

US 2007/0071360 A1 Mar. 29, 2007

Related U.S. Application Data

(63) Continuation-in-part of application No. 11/360,603, filed on Feb. 24, 2006, now abandoned.

(30) Foreign Application Priority Data

Sep. 15, 2005 (JP) .................................. 2005-268216
Jun. 30, 2006 (JP) .................................. 2006-181692

(51) Int. Cl.
*G06K 9/32* (2006.01)
(52) U.S. Cl.
USPC ............................. 382/298; 382/299; 382/300
(58) Field of Classification Search
USPC ................................................. 382/298–300
See application file for complete search history.

(56) References Cited

U.S. PATENT DOCUMENTS

| | | | | |
|---|---|---|---|---|
| 4,503,469 A * | 3/1985 | Kato | .............................. | 358/451 |
| 5,469,223 A * | 11/1995 | Kimura | ......................... | 348/581 |
| 6,002,811 A * | 12/1999 | Koshimizu et al. | ........... | 382/298 |
| 6,097,855 A * | 8/2000 | Levien | .......................... | 382/296 |
| 6,400,852 B1 * | 6/2002 | Miller et al. | .................. | 382/298 |
| 6,490,057 B1 * | 12/2002 | Sakaguchi | .................... | 358/412 |
| 2005/0117033 A1 * | 6/2005 | Matsui | .......................... | 348/239 |
| 2006/0056715 A1 | 3/2006 | Goda | | |

FOREIGN PATENT DOCUMENTS

| | | |
|---|---|---|
| EP | 1-347-411 A | 9/2003 |
| JP | 05-040826 | 2/1993 |
| JP | 09-037072 | 2/1997 |

(Continued)

OTHER PUBLICATIONS

Anthony Parker at al, Comparison of Interpolating Methods for Image Resampling.*

(Continued)

*Primary Examiner* — Chan S Park
*Assistant Examiner* — Mark Roz
(74) *Attorney, Agent, or Firm* — Sterne, Kessler, Goldstein & Fox P.L.L.C.

(57) ABSTRACT

An image processing apparatus includes a data supply node to receive line data scanned in a main scan direction of an image, an image enlargement unit coupled to the data supply node to apply to the line data an enlargement process for enlarging the image by an enlargement factor equal to an integer so as to produce enlarged data at an output node, and an image reduction unit coupled to the output node of the image enlargement unit to apply to the enlarged data a reduction process for reducing the enlarged image by a desired reduction factor so as to produce reduced data at an output node.

10 Claims, 21 Drawing Sheets

(56) References Cited

FOREIGN PATENT DOCUMENTS

| | | |
|---|---|---|
| JP | 11-32208 | 2/1999 |
| JP | 2004-282305 A | 10/2004 |
| JP | 2004-297314 A | 10/2004 |
| JP | 2005-115598 A | 4/2005 |
| JP | 2005-136891 | 5/2005 |
| JP | 2005-167517 | 6/2005 |
| JP | 2005-176036 | 6/2005 |
| JP | 2006-173876 A | 6/2006 |
| WO | WO2004/043056 | 5/2004 |

OTHER PUBLICATIONS

Chinese Office Action dated Mar. 14, 2008, 8 pages.
European Search Report regarding Application 06254768.-1228 dated Aug. 8, 2007.
Japanese Office Action and Partial English Translation of the Japanese Office Action No. 2006-181692; dated Aug. 2, 2011.
Japanese Office Action 2006-181692, dated May 29, 2011, and English Translation of the Japanese Office Action.
Japanese Office Action 2006-181692, dated Mar. 29, 2011, and English Translation of the Japanese Office Action.

* cited by examiner

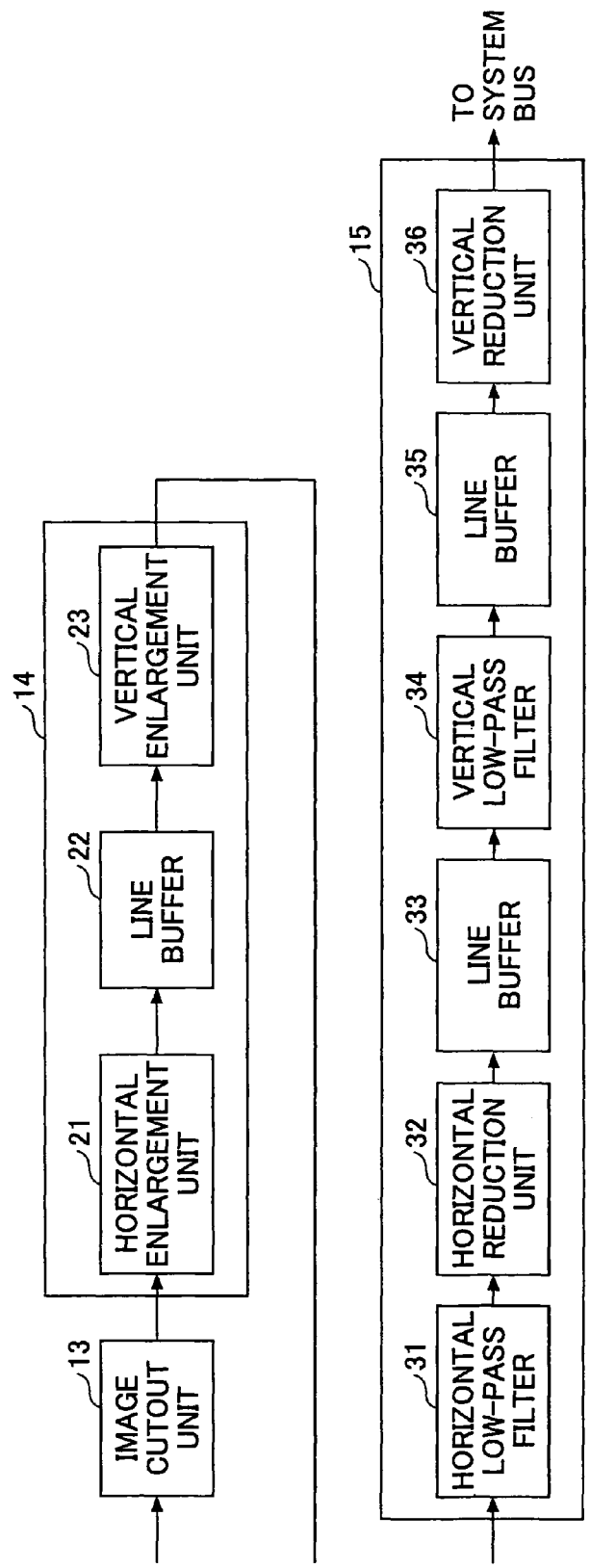

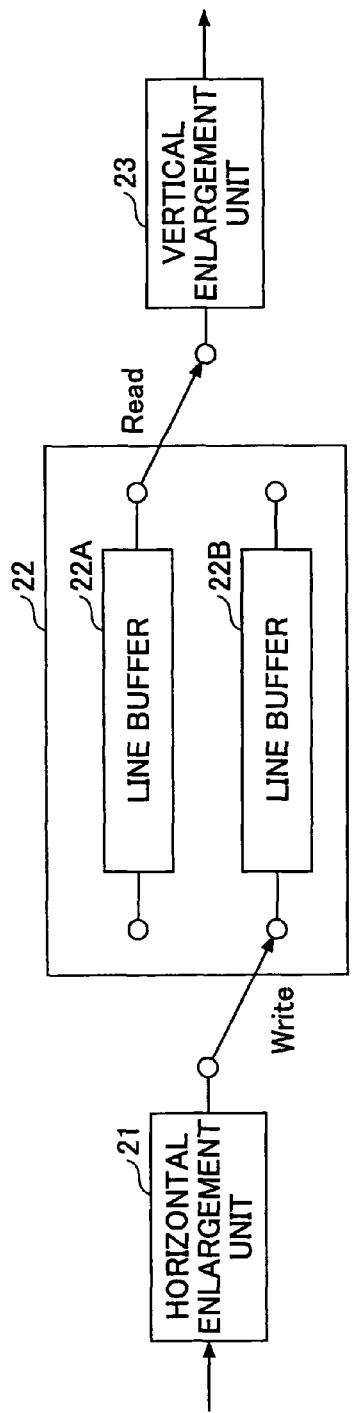
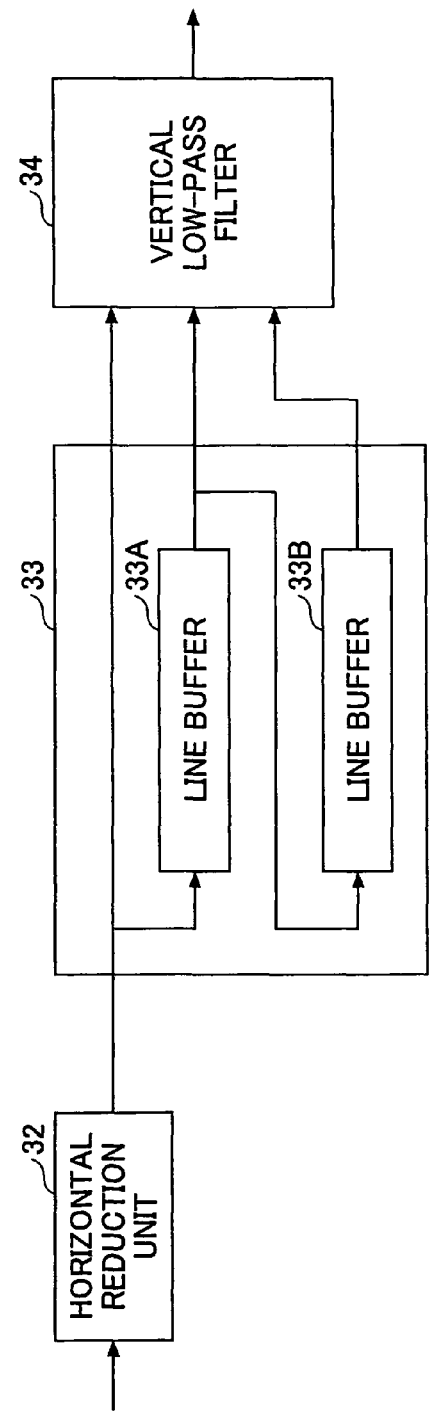

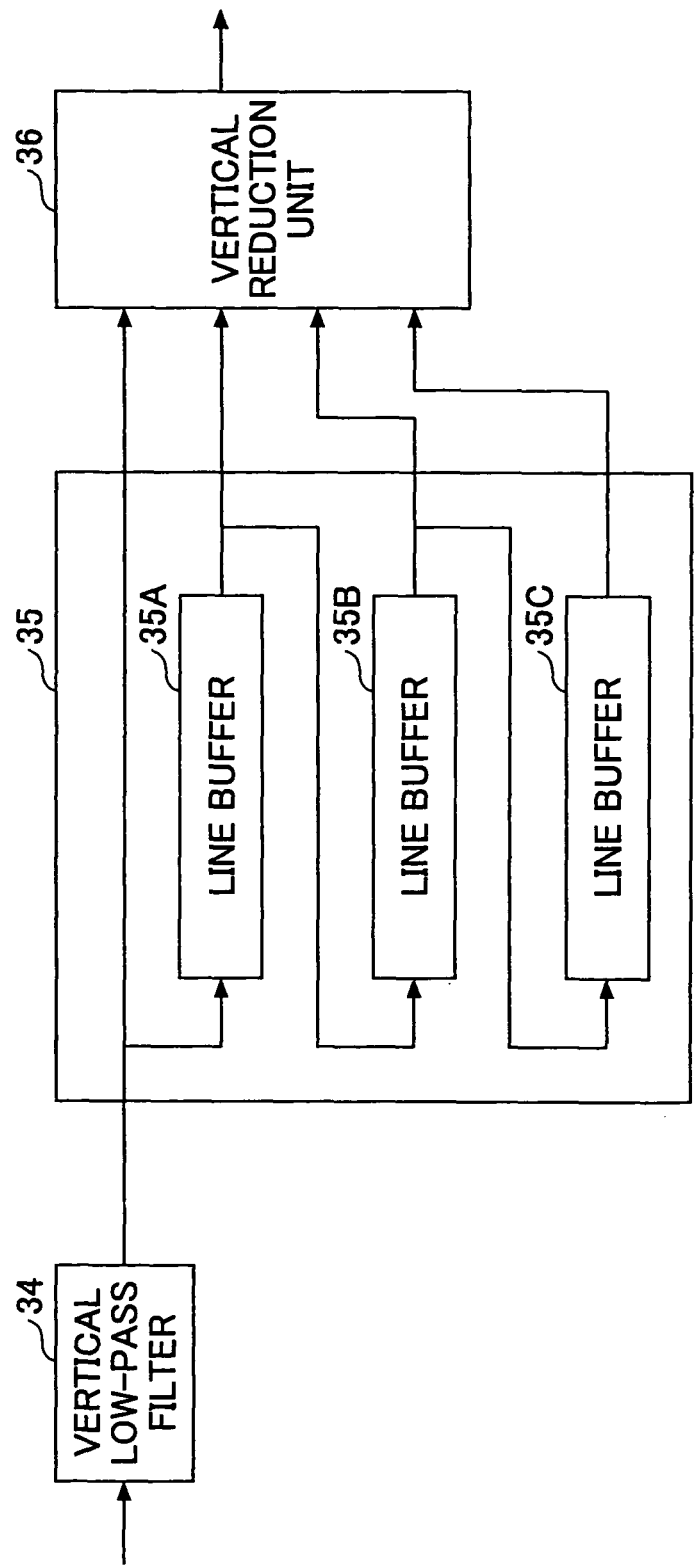

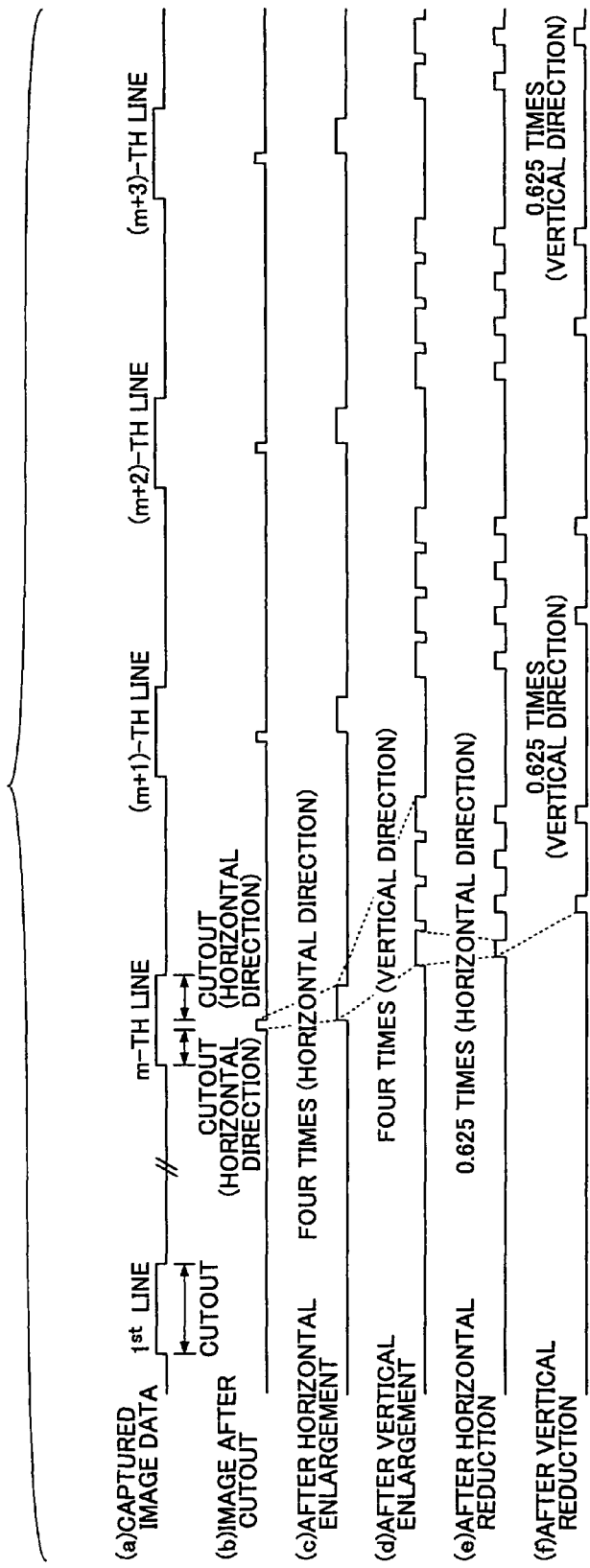

CAPTURED IMAGE DATA

IMAGE AFTER CUTOUT

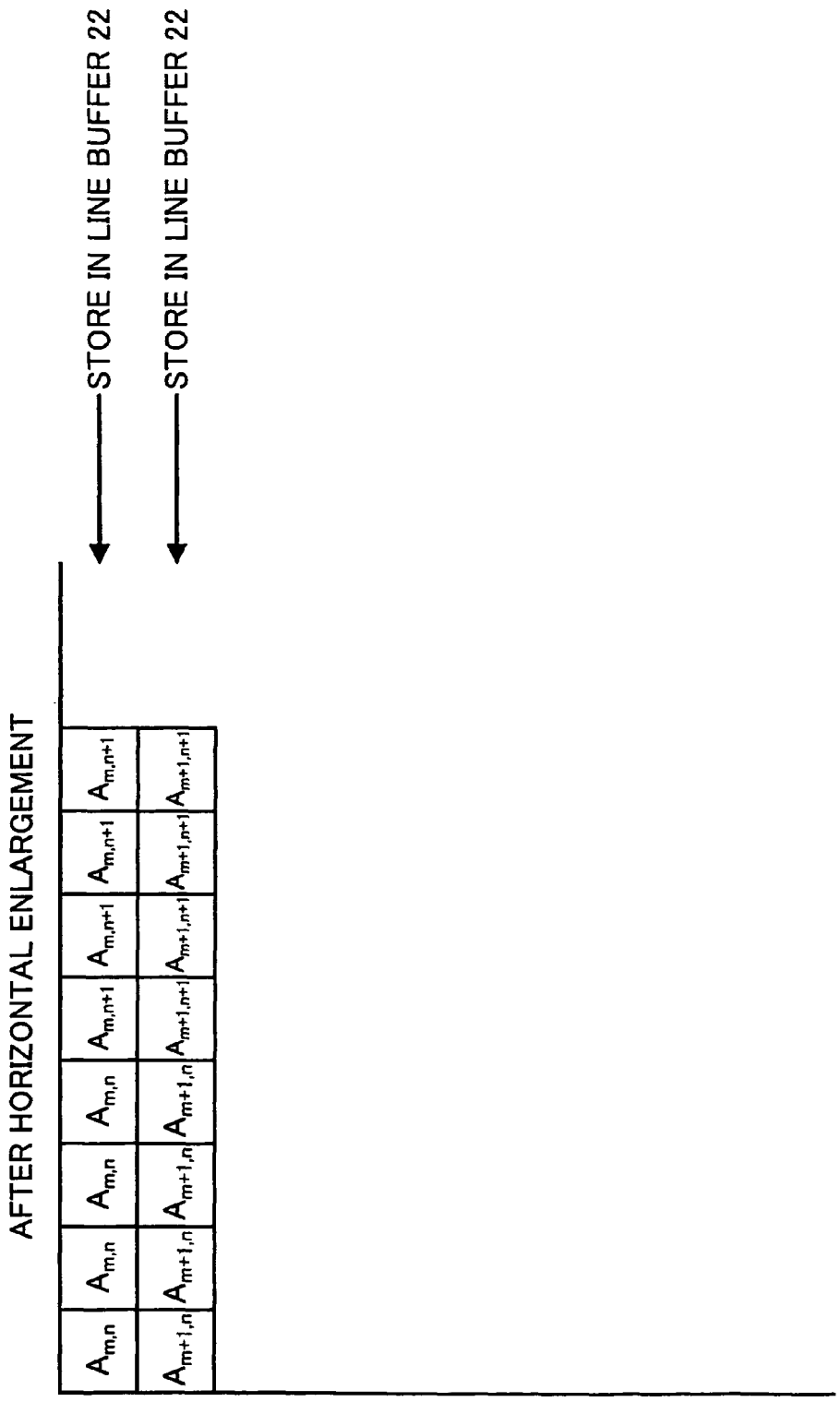

FIG.11

AFTER VERTICAL ENLARGEMENT

| $A_{m,n}$ | $A_{m,n}$ | $A_{m,n}$ | $A_{m,n}$ | $A_{m,n+1}$ | $A_{m,n+1}$ | $A_{m,n+1}$ | $A_{m,n+1}$ |
|---|---|---|---|---|---|---|---|
| $A_{m,n}$ | $A_{m,n}$ | $A_{m,n}$ | $A_{m,n}$ | $A_{m,n+1}$ | $A_{m,n+1}$ | $A_{m,n+1}$ | $A_{m,n+1}$ |
| $A_{m,n}$ | $A_{m,n}$ | $A_{m,n}$ | $A_{m,n}$ | $A_{m,n+1}$ | $A_{m,n+1}$ | $A_{m,n+1}$ | $A_{m,n+1}$ |
| $A_{m,n}$ | $A_{m,n}$ | $A_{m,n}$ | $A_{m,n}$ | $A_{m,n+1}$ | $A_{m,n+1}$ | $A_{m,n+1}$ | $A_{m,n+1}$ |
| $A_{m+1,n}$ | $A_{m+1,n}$ | $A_{m+1,n}$ | $A_{m+1,n}$ | $A_{m+1,n+1}$ | $A_{m+1,n+1}$ | $A_{m+1,n+1}$ | $A_{m+1,n+1}$ |
| $A_{m+1,n}$ | $A_{m+1,n}$ | $A_{m+1,n}$ | $A_{m+1,n}$ | $A_{m+1,n+1}$ | $A_{m+1,n+1}$ | $A_{m+1,n+1}$ | $A_{m+1,n+1}$ |
| $A_{m+1,n}$ | $A_{m+1,n}$ | $A_{m+1,n}$ | $A_{m+1,n}$ | $A_{m+1,n+1}$ | $A_{m+1,n+1}$ | $A_{m+1,n+1}$ | $A_{m+1,n+1}$ |
| $A_{m+1,n}$ | $A_{m+1,n}$ | $A_{m+1,n}$ | $A_{m+1,n}$ | $A_{m+1,n+1}$ | $A_{m+1,n+1}$ | $A_{m+1,n+1}$ | $A_{m+1,n+1}$ |

FIG.15

AFTER VERTICAL REDUCTION

| $C_{1,1}$ | $C_{1,2}$ | . | . | . | . |
|---|---|---|---|---|---|
| $C_{2,1}$ | $C_{2,2}$ | . | . | . | . |
| . | . | . | | | |
| . | . | | . | | |
| . | . | | | . | |
| . | . | | | | . |

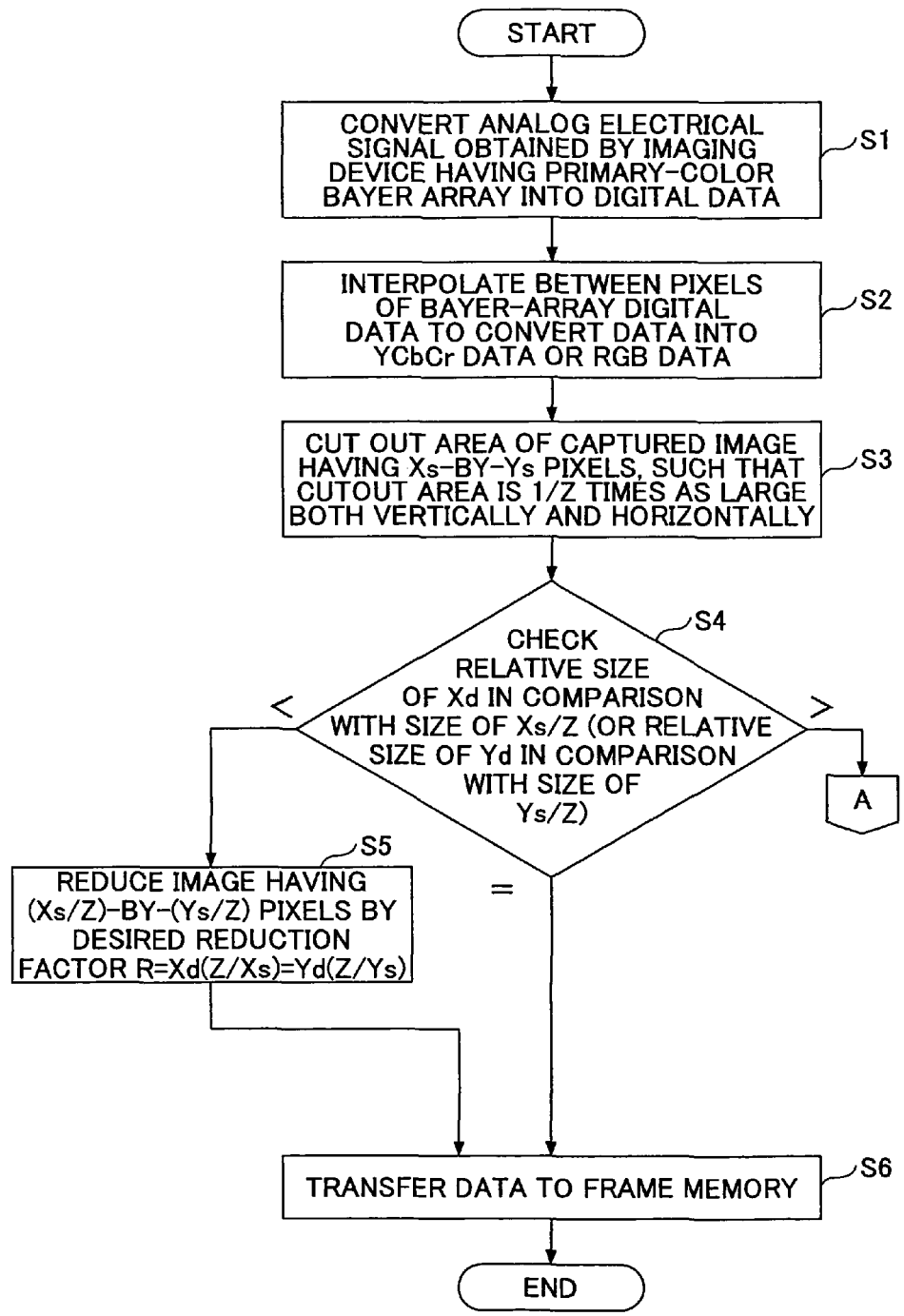

IMAGE PROCESSING APPARATUS AND METHOD FOR IMAGE RESIZING MATCHING DATA SUPPLY SPEED

CROSS-REFERENCE TO RELATED APPLICATIONS

This application is a continuation-in-part of U.S. patent application Ser. No. 11/360,603, filed Feb. 24, 2006, now abandoned and claims the benefit of priority from Japanese Patent Application No. 2005-1268216 filed on Sep. 15, 2005 and Japanese Patent Application No. 2006-181692 filed on Jun. 30, 2006. The entire contents of these applications are incorporated herein by reference.

BACKGROUND OF THE INVENTION

1. Field of the Invention

The present invention generally relates to image processing apparatuses and image processing methods, and particularly relates to an image processing apparatus and image processing method for enlarging and reducing an image.

2. Description of the Related Art

Enlargement and reduction of a digital image is a process of resampling that changes the sampling intervals corresponding to pixel positions of an original image into different sampling intervals. In general, such process requires that the pixel values of the original image be interpolated by newly generated pixel values (i.e., new pixel values are generated from the pixel values of the original image to be inserted between the pixels of the original image). Examples of such interpolation include nearest neighbor interpolation, bilinear interpolation, bicubic interpolation, etc.

Nearest neighbor interpolation uses the value of a pixel closest to a pixel of interest for which a pixel value needs to be obtained, as the pixel value of this pixel of interest, and is the simplest interpolation method. Bilinear interpolation obtains the pixel value of a pixel of interest by applying linear interpolation to the values of four neighboring pixels situated at the top, bottom, left, and right of the pixel of interest for which a pixel value needs to be obtained. Bicubic interpolation uses a cubic function for interpolation. In general, a cubic polynomial is calculated based on the pixel values of 16 neighboring pixels (four pixel by four pixel) surrounding a pixel of interest for which a pixel value needs to be obtained, thereby obtaining the pixel value of this pixel of interest. There are other interpolation methods such as a method that uses a sinc function. From the viewpoint of the balance between the amount of computation and the quality of an image, bicubic interpolation is typically used as a preferred method that produces satisfactory results.

Digital cameras are provided with digital zoom functions. In digital zoom processing, a portion of image data captured by the CCD/CMOS image sensor is cut out, and this extracted partial image is enlarged or reduced so as to become an image of desired image size. In conventional configurations, a color processor performs an image cutout process on the output data of the image sensor, and the image data is then temporarily stored in a frame memory, followed by using a scaler provided as a separate module to perform enlargement or reduction.

The color processor is a circuit that receives image data from the image sensor and performs signal processing such as defect pixel correction for correcting defects by processing the data of defect pixels contained in image signals, color interpolation for obtaining color data with respect to each pixel based on color information from the RGB Bayer array, shading correction for correcting lens distortion based on the color data, etc. The scaler is provided as a module separate from the color processor. The scaler serves to perform image enlargement or reduction by applying bicubic interpolation or the like to the image data stored in the frame memory.

In the conventional configuration as described above, the frame memory is provided as an intervening element between the cutout process performed by the color processor and the enlargement or reduction process performed by the scaler. This is because it is difficult to perform enlargement at arbitrary magnification in a sequential manner by matching the speed of the output of the image sensor. The output of the image sensor is supplied at predetermined speed as scan line data that has been scanned in the main scan direction. If the image data is to be processed for enlargement or reduction without being stored in a frame memory, such processing needs to be performed at the same speed as the speed at which the image data stream is supplied as scan line data.

In order to process line data output from the image sensor sequentially by matching the data supply speed, processing on each pixel or each image block needs to be performed repeatedly at constant intervals. In image enlargement at arbitrary magnification, however, the pixel value of the same pixel needs to be referred to more than once for interpolation to increase the number of samplings. Also, in the case of enlargement by a factor that is not equal to an integer, the number of times that the same pixel value is referred to may differ from pixel to pixel.

When enlargement by a factor of 1.5 is performed by use of nearest neighbor interpolation, for example, the (n−1)-th pixel is referred to once, the n-th pixel referred to twice, and the (n+1)-th pixel referred to once, which is repeated for horizontal enlargement. Further, each pixel of the (n−1)-th line is referred to once, each pixel of the n-th line referred to twice, and each pixel of the (n+1)-th line referred to once, which is repeated for vertical enlargement. In this manner, the number of times that a pixel value is referred to is not constant, and, also, such number varies in response to a magnification factor. This makes it difficult to perform sequential processing at constant intervals with respect to any given magnification factor.

In consideration of this, the conventional digital zoom processing uses an intervening frame memory between the image cutout process and the enlargement or reduction process, thereby making it possible to perform enlargement/reduction without requiring a needlessly complex algorithm and circuit configuration. Such configuration, however, have a memory access occurring between the image cutout process and the enlargement/reduction process, resulting in inefficient processing. Further, since intermediary data is stored in memory, an excess memory area needs to be set aside.

Patent Document 1 discloses a technology that improves the speed of a cutout process by eliminating the need to make settings to the horizontal and vertical pixel sizes and the need to convert the number of pixels. Patent Document 2 discloses a technology that is used for the configuration in which sensitivity is improved by pixel summation when a picture of a poorly illuminated object is taken. This technology produces high sensitivity image data having desired size by resizing image data by n times horizontally and m times vertically, compared to the image size that is to be produced and displayed after pixel summation, followed by performing n-horizontal-pixel-by-m-vertical-pixel pixel summation after the resizing.

[Patent Document 1] Japanese Patent Application Publication No. 2004-282305

[Patent Document 2] Japanese Patent Application Publication No. 2005-115598

Accordingly, there is a need for an image processing apparatus that can perform image enlargement or reduction at any desired magnification by processing line data sequentially by matching its data supply speed as the line data is scanned on an image in the main scan direction.

SUMMARY OF THE INVENTION

It is a general object of the present invention to provide an image processing apparatus that substantially obviates one or more problems caused by the limitations and disadvantages of the related art.

Features and advantages of the present invention will be presented in the description which follows, and in part will become apparent from the description and the accompanying drawings, or may be learned by practice of the invention according to the teachings provided in the description. Objects as well as other features and advantages of the present invention will be realized and attained by the image processing apparatus particularly pointed out in the specification in such full, clear, concise, and exact terms as to enable a person having ordinary skill in the art to practice the invention.

To achieve these and other advantages in accordance with the purpose of the invention, the invention provides an image processing apparatus which includes a data supply node to receive line data scanned in a main scan direction of an image, an image enlargement unit coupled to the data supply node to apply to the line data an enlargement process for enlarging the image by an enlargement factor equal to an integer so as to produce enlarged data at an output node, and an image reduction unit coupled to the output node of the image enlargement unit to apply to the enlarged data a reduction process for reducing the enlarged image by a desired reduction factor so as to produce reduced data at an output node.

Further, according to another aspect of the present invention, an image processing method includes the steps of receiving line data scanned in a main scan direction of an image at predetermined data speed, applying to the line data an enlargement process for enlarging the image by an enlargement factor equal to an integer so as to produce enlarged data, and applying to the enlarged data a reduction process for reducing the enlarged image by a desired reduction factor so as to produce reduced data, wherein the above steps are performed as a series of processes that match the data speed.

According to at least one embodiment of the present invention, an image reduction is performed after an enlargement at an integer magnification factor is performed, thereby producing an image having desired magnification. With this provision, line data scanned in the main scan direction of an image can be readily processed sequentially by matching its data supply speed. This makes it possible to perform enlargement or reduction at any desired magnification by use of a relatively simple circuit configuration without using an intervening frame memory and without requiring excess memory space for intermediary data.

BRIEF DESCRIPTION OF THE DRAWINGS

Other objects and further features of the present invention will be apparent from the following detailed description when read in conjunction with the accompanying drawings, in which:

FIG. 3 is a block diagram showing an example of the configuration of an image enlargement unit and image reduction unit;

FIG. 4 is a drawing showing an example of a double-buffer configuration for use as a line buffer for vertical enlargement;

FIG. 5 is a drawing showing an example of the configuration of a line buffer for vertical low-pass filtering;

FIG. 6 is a drawing showing an example of the configuration of a line buffer for vertical reduction;

FIG. 7 is a drawing showing image data at each process stage of the image enlargement process by the image processing apparatus of FIG. 1;

FIG. 10 is an illustrative drawing showing horizontally enlarged image data;

FIG. 11 is an illustrative drawing showing vertically enlarged image data;

FIG. 15 is an illustrative drawing showing vertically reduced image data;

FIGS. 16A and 16B are flowcharts showing the procedure of image cutout and image enlargement/reduction process according to the present invention;

DESCRIPTION OF THE PREFERRED EMBODIMENTS

In the following, embodiments of the present invention will be described with reference to the accompanying drawings.

Figure 1:
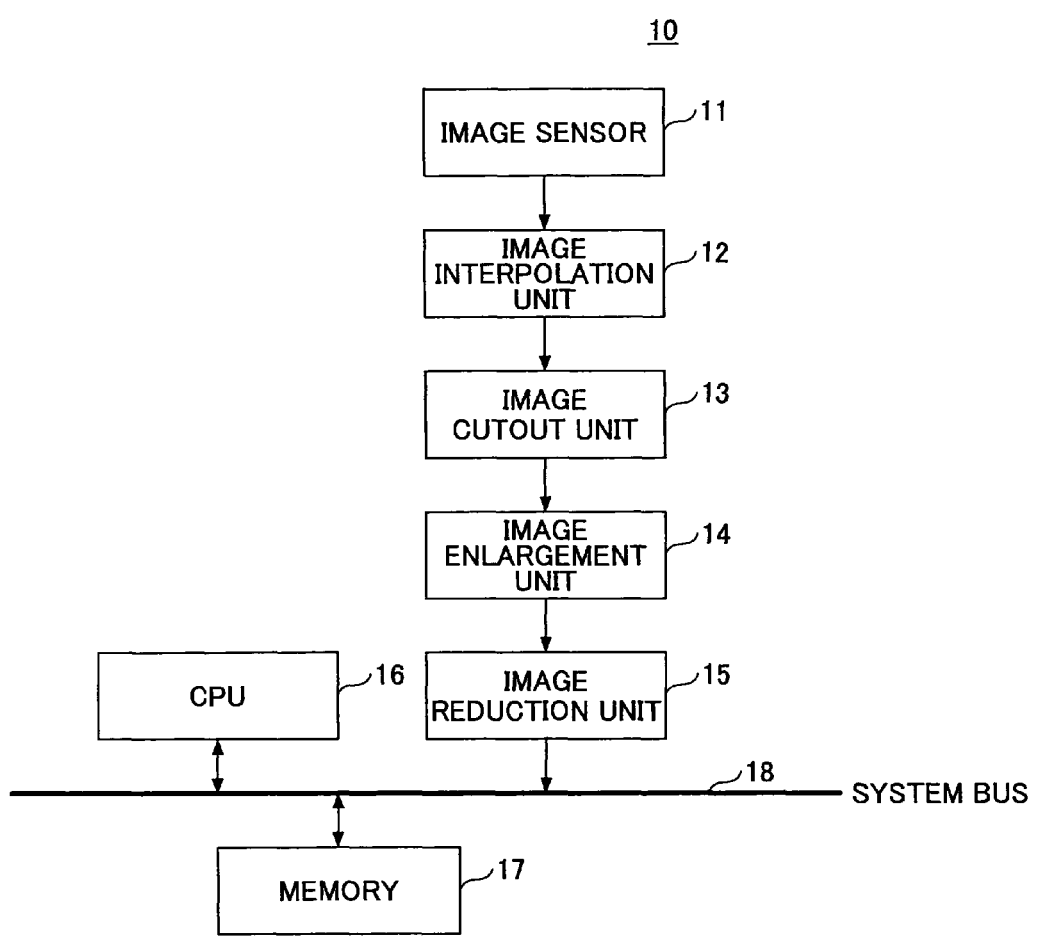
FIG. 1 is a block diagram showing an example of the configuration of an image processing apparatus according to the present invention.

FIG. 1 is a block diagram showing an example of the configuration of an image processing apparatus according to the present invention. An image processing apparatus 10 shown in FIG. 1 includes an image sensor 11, an image interpolation unit 12, an image cutout unit 13, an image enlargement unit 14, an image reduction unit 15, a CPU 16, a memory 17, and a system bus 18.

The image sensor 11 may be a solid-state imaging device such as a CCD or CMOS, and has a light detecting section in which a plurality of photodiodes are arranged in matrix. These photodiodes constitute individual pixels for the imaging purpose. Incident light is subjected to photoelectric conversion on a pixel-by-pixel basis. Electric charge obtained by the photoelectric conversion is stored in an electric charge storage section for readout. The readout image signal is then amplified and A/D-converted into digital image data, which is supplied to the subsequent stage.

Along with the digital image data, a vertical synchronizing signal, horizontal synchronizing signal, and a clock signal synchronized with the image data signal are supplied. The digital image data to be output is scan line data scanned in the main scan direction, and is supplied (output) at predetermined speed.

The image interpolation unit 12 receives the digital image data from the image sensor 11, and performs color interpolation that produces color data with respect to each pixel based on color information from the RGB Bayer array. Other signal processing such as defect pixel correction for correcting defects by processing the data of defect pixels contained in the image signal, shading correction for correcting lens distortion based on the color data, and the like may also be performed as appropriate. The image data processed by the image interpolation unit 12 is supplied to the image cutout unit 13. This supplied image data is scan line data scanned in the main scan direction, and is supplied at predetermined speed.

The image cutout unit 13 cuts out partial image data corresponding to a specified portion of the supplied image data. Through this cutout process, only the image data corresponding to the specified portion of the scan line data of the original image is supplied as valid data to the image enlargement unit 14. This supplied image data is scan line data scanned in the main scan direction, and is supplied at predetermined speed.

The image enlargement unit 14 performs image enlargement at a fixed magnification with respect to the supplied image data. The enlargement at a fixed magnification refers to a magnification factor that is equal to an integer such as 1, 2, 4, . . . , n, and that is not freely adjustable. The magnification factor may be fixed to a factor equal to a single integer such as 4, for example. Alternatively, a plurality of integer magnification factors such as 1, 2, 4, . . . , n are provided in advance, and a desired magnification factor may be selected therefrom.

The image enlargement unit 14 performs enlargement by a magnification factor equal to an integer, rather than enlargement by any given magnification factor. When nearest neighbor interpolation is employed, for example, the same pixel data is output n times for each pixel in the case of n-times enlargement in the horizontal direction, and the same line data is output n times for each line in the case of n-times enlargement in the vertical direction. Accordingly, enlargement can be performed as a process repeated at constant intervals by holding the line data in a line buffer for a constant time period for image enlargement. A sequential process matching the data supply speed thus can be readily achieved. Even when another interpolation scheme such as bilinear interpolation or bicubic interpolation different from nearest neighbor interpolation is employed, the situation is the same in that enlargement can be performed as a process repeated at constant intervals with a constant data-hold period.

The image data of the image enlarged by a factor equal to an integer by the image enlargement unit 14 is supplied to the image reduction unit 15. This supplied image data is scan line data scanned in the main scan direction, and is supplied at predetermined speed.

The image reduction unit 15 is configured such as to perform image reduction at any desired magnification. In order to resize the image data of the image temporarily enlarged by the image enlargement unit 14 to generate an image of desired image size, the image reduction unit 15 performs image reduction by a reduction factor determined as a ratio of the enlarged image size to the desired image size.

For the sake of convenience of explanation, nearest neighbor interpolation is used to achieve reduction by a factor of ⅔ as a simple example. In the case of horizontal reduction, two pixels out of three consecutive pixels are referred to once, and the one remaining pixel is not referred to. Such a process is repeated again and again. In the case of horizontal reduction, each pixel of two lines out of three consecutive lines are referred to once, and the pixels of the one remaining line are not referred to. Such a process is repeated again and again. In this case, it suffices to keep constant the time period during which the line data is stored in the line buffer and to perform constant-time-interval processes while skipping some of the processes. A sequential process matching the data supply speed thus can be readily achieved. Even when another interpolation scheme such as bilinear interpolation or bicubic interpolation different from nearest neighbor interpolation is employed, the situation is the same in that reduction can be performed by performing constant-time-interval processes with a constant data-hold time while skipping some of the processes.

In this reduction process, the image data is preferably processed by use of bilinear interpolation, bicubic interpolation, or the like. Further, a low-pass filtering process may preferably performed prior to the reduction process, thereby improving the image quality of the image enlarged by nearest neighbor interpolation using the original pixel values as they are. It should be noted that the image reduction unit 15 may also be used to reduce data size for storage in the frame memory (memory 17) in addition to perform a digital zoom process. In such a case, the magnification factor (reduction factor) is set to 1.

The image data having desired image size output from the image reduction unit 15 is stored in the memory 17 (frame memory) via the system bus 18. The CPU 16 controls the operation of each part of the image processing apparatus 10.

In the image processing apparatus 10 according to the present invention shown in FIG. 1, image reduction is performed after an enlargement at an integer magnification factor is performed, thereby producing an image having desired magnification. With this provision, line data scanned in the main scan direction of an image can be readily processed sequentially by matching its data supply speed. This makes it possible to perform enlargement or reduction at any desired magnification by use of a relatively simple circuit configuration without using an intervening frame memory. It should be noted that if the desired image size is a reduced size compared with the size of the original image, the enlargement process may not be performed.

Figure 2:
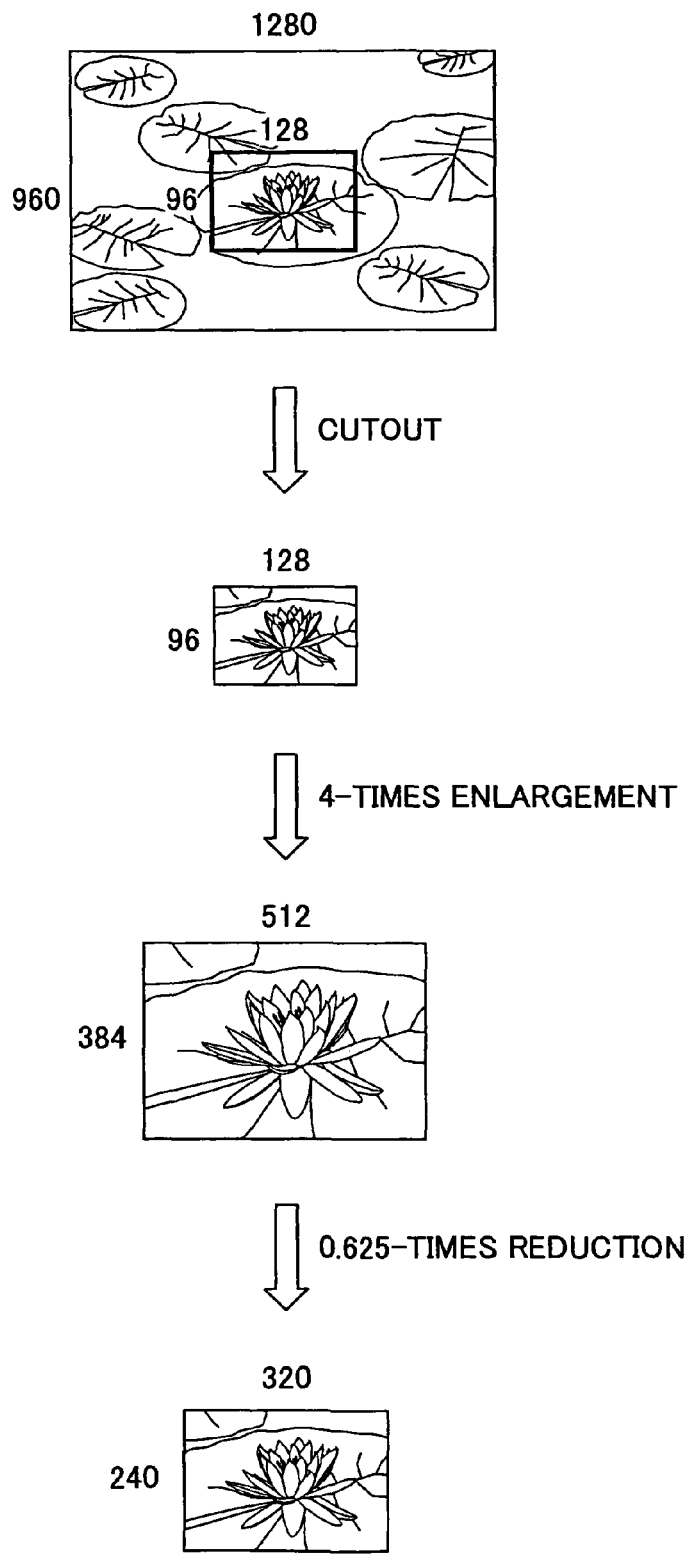
FIG. 2 is an illustrative drawing showing an image enlargement process according to the present invention.

FIG. 2 is an illustrative drawing showing an image enlargement process according to the present invention. The original image is an SXGA image (1280 by 960 pixels), a portion of which is cut out for zoom (enlargement) by a factor of 10. The desired image size to be stored in the frame memory is QVGA (320 by 240 pixels).

First, the image cutout unit 13 cuts out an area of 128-x-96 pixels as a partial image, which is ⅒ in the vertical and horizontal directions of the image captured by the image sensor 11. Then, the image enlargement unit 14 enlarges the cutout partial image to produce an image that is larger than QVGA, which is the desired size. If the magnification factor is selectable from 1, 2, and 4, for example, it suffices to set the magnification factor to 4. Finally, the image reduction unit 15 reduces the image enlarged to 512-x-384 pixels, by a factor of 0.625 in the vertical direction and in the horizontal direction, thereby producing a QVGA image having the desired size.

FIG. 3 is a block diagram showing an example of the configuration of the image enlargement unit 14 and the image reduction unit 15. As shown in FIG. 3, the image enlargement unit 14 includes a horizontal enlargement unit 21, a line buffer 22, and a vertical enlargement unit 23. The image reduction unit 15 includes a horizontal low-pass filter 31, a horizontal reduction unit 32, a line buffer 33, a vertical low-pass filter 34, a line buffer 35, and a vertical reduction unit 36.

The horizontal enlargement unit 21 may be configured to repeat the pixel value of each pixel in the horizontal direction (the main scan direction) as many times as necessary to achieve the desired magnification factor by use of nearest neighbor interpolation. If image enlargement of higher image quality is required, bilinear interpolation or bicubic interpolation may be employed.

The line buffer 22 serves to hold line data after horizontal enlargement as output from the horizontal enlargement unit 21. By repeatedly referring to the pixel values held in the line buffer 22, the vertical enlargement unit 23 performs vertical enlargement based on nearest neighbor interpolation. When nearest neighbor interpolation is used, it suffices to use a line buffer having a single stage corresponding to a single horizontal line. In order to improve processing efficiency, however, a double-buffer configuration may alternatively be used as shown in FIG. 4. In the double-buffer configuration shown in FIG. 4, two line buffers 22A and 22B are provided. While data is written to one of the line buffers, data is read from the other one of the line buffers to be processed.

If bilinear interpolation or bicubic interpolation is used, the line buffer 22 needs to include a plurality of stages corresponding to respective horizontal lines. Pixel values held in the plurality of stages of line buffers are referred to so as to calculate interpolating values between the lines according to a predetermined interpolating formula that is either a linear function or a cubic function, thereby generating pixel values for a new horizontal line that is to be inserted between the horizontal lines of the original image.

The horizontal low-pass filter 31 performs low-pass filtering in the horizontal direction so as to remove high frequency components that may cause alias noise after image reduction. The horizontal reduction unit 32 uses an interpolation method such as bilinear interpolation or bicubic interpolation to reduce the image data in the horizontal direction. The vertical low-pass filter 34 performs low-pass filtering in the vertical direction so as to remove high frequency components that may cause alias noise after image reduction.

The line buffer 33 serves to hold line data after horizontal reduction as output from the horizontal reduction unit 32. The line buffer 33 includes stages of line buffers corresponding in number to the number of the taps of the vertical low-pass filter 34. If the number of the taps of the vertical low-pass filter 34 is three so as to perform low-pass filtering extending over three pixels in the vertical direction, for example, the line buffer 33 may have a configuration as shown in FIG. 5.

The line buffer 33 shown in FIG. 5 has a two-stage configuration that includes a line buffer 33A and a line buffer 33B each corresponding to one horizontal line. The individual pixel values of one line after horizontal reduction are supplied successively from the horizontal reduction unit 32, and are stored successively in the line buffer 33A, resulting in the line buffer 33A storing the image data for one line. Thereafter, the individual pixel values of the next one line after horizontal reduction are supplied successively from the horizontal reduction unit 32, and are stored successively in the line buffer 33A, while the individual pixel values of the preceding line already stored in the line buffer 33A are successively output therefrom to be successively stored in the line buffer 33B. With this arrangement, the vertical low-pass filter 34 receives a pixel value at a given horizontal position on the (n+2)-th line directly supplied from the horizontal reduction unit 32, a pixel value at the same horizontal position on the (n+1)-th line supplied from the line buffer 33A, and a pixel value at the same horizontal position on the n-th line supplied from the line buffer 33B.

The vertical reduction unit 36 uses an interpolation method such as bilinear interpolation or bicubic interpolation so as to reduce the line data in the horizontal direction as it is output from the vertical low-pass filter 34. In so doing, the line buffer 35 holds the line data output from the vertical low-pass filter 34. By referring to the pixel values of this line data held in the line buffer 35, the vertical reduction unit 36 performs reduction.

If bilinear interpolation or bicubic interpolation is used, the line buffer 35 needs to include a plurality of stages corresponding to respective horizontal lines. Pixel values held in the plurality of stages of line buffers are referred to so as to calculate interpolating values between the lines according to a predetermined interpolating formula that is either a linear function or a cubic function, thereby generating pixel values for a horizontal line of the reduced image that is situated between the horizontal lines of the original image.

The number of stages provided in the line buffer 35 depends on the type of interpolation. In the case of bicubic interpolation, the pixel values of 4-×-4 pixels are referred to. In this case, therefore, the configuration as shown in FIG. 6 may be employed.

The line buffer 35 shown in FIG. 6 has a three-stage configuration that includes a line buffer 35A, a line buffer 35B, and a line buffer 35C each corresponding to one horizontal line. The individual pixel values of one line are supplied successively from the vertical low-pass filter 34, and are stored successively in the line buffer 35A, resulting in the line buffer 35A storing the image data for one line. Thereafter, the individual pixel values of the next one line are supplied successively from the vertical low-pass filter 34, and are stored successively in the line buffer 35A, while the individual pixel values of the preceding line already stored in the line buffer 35A are successively output therefrom to be successively stored in the line buffer 35B. After this, the individual pixel values of the further next line are supplied successively from the vertical low-pass filter 34, and are stored successively in the line buffer 35A, while the individual pixel values of the preceding line already stored in the line buffer 35A are successively output therefrom to be successively stored in the line buffer 35B, while the individual pixel values of the further preceding line already stored in the line buffer 35B are successively output therefrom to be successively stored in the line buffer 35C.

With this arrangement, the vertical reduction unit 36 receives a pixel value at a given horizontal position on the (n+3)-th line directly supplied from the vertical low-pass filter 34, a pixel value at the same horizontal position on the (n+2)-th line supplied from the line buffer 35A, a pixel value at the same horizontal position on the (n+1)-th line supplied from the line buffer 35B, and a pixel value at the same horizontal position on the n-th line supplied from the line buffer 35C. The vertical reduction unit 36 calculates a predetermined cubic interpolation function based on these four pixel values so as to obtain a pixel value of a horizontal line of the reduced image that is situated between the horizontal lines of the original image.

FIG. 7 is a drawing showing image data at each process stage of the image enlargement process by the image processing apparatus 10. In FIG. 7, the HIGH periods of each signal waveform indicate a data valid period, and the LOW periods thereof indicate a data invalid period. Further, the example shown in FIG. 7 corresponds to the example shown in FIG. 2, and illustrates image data obtained at each process stage of enlargement and reduction by which partial image data extracted from original image data is enlarged four times, followed by being reduced by a factor of 0.625.

Letter designation (a) corresponds to captured image data. As shown in (a), the digital image data obtained by the image sensor 11 is comprised of image data chunks corresponding to respective horizontal lines that are successively output one chunk by one chunk where the image data of one horizontal line constitute one chunk. Between the adjacent horizontal lines, a blanking period where no image data is present is provided as a margin, a time period of which may be used for the purpose of aperture adjustment or the like.

Post-cutout image data is obtained as shown in (b) by cutting out portions of the captured image data shown in (a). In this example, the cutting out of an image starts from the m-th horizontal line in the vertical direction. No cutout image data exists prior to the m-th horizontal line, and some cutout image data exists with respect to the m-th through (m+3)-th lines (e.g., m-th through (m+95)-th lines if other lines than those illustrated are also counted). In each of the m-th through (m+3)-th lines illustrated in FIG. 7, the length of data for one horizontal line (the length of a valid period) is shortened by the cutout process.

The image data after the image cutout shown in (b) is enlarged in the horizontal direction by a factor that is equal to an integer (4 in the example shown in FIG. 7). What is illustrated in (c) corresponds to the image data after such horizontal enlargement. The length of data for one horizontal line (the length of a valid period) is four times as long as the image data after the image cutout shown in (b). This represents the fact that the number of pixels in the horizontal direction has become four times as many.

Thereafter, the image data after the horizontal enlargement shown in (c) is enlarged in the vertical direction by a factor that is equal to an integer (4 in the example shown in FIG. 7). What is illustrated in (d) corresponds to the image data after such vertical enlargement. Data for four horizontal lines are generated separately for each horizontal line of the image data after the horizontal enlargement shown in (c).

After this, the image data after such vertical enlargement shown in (d) is reduced by a factor of 0.625 in the horizontal direction. What is illustrated in (e) corresponds to the image data after such horizontal reduction. The length of data for one horizontal line (the length of a valid period) is 0.625 times as long as the image data after the vertical enlargement shown in (d). This represents the fact that the number of pixels in the horizontal direction has become 0.625 times as many.

Finally, the image data after such horizontal reduction shown in (e) is reduced by a factor of 0.625 in the vertical direction. What is illustrated in (f) corresponds to the image data after such vertical reduction. The number of horizontal lines has become 0.625 times as many as the image data after the horizontal reduction shown in (e). In so doing, if nearest neighbor interpolation is employed, all that is necessary is to select 0.625n lines out of n horizontal lines for outputting. If another interpolation scheme such as bilinear interpolation or bicubic interpolation is employed, pixel values of a plurality of horizontal lines are referred to so as to calculate an interpolating value between lines according to an interpolation function that is either a linear function or a cubic function, thereby generating data for 0.625n horizontal lines.

Figure 8:
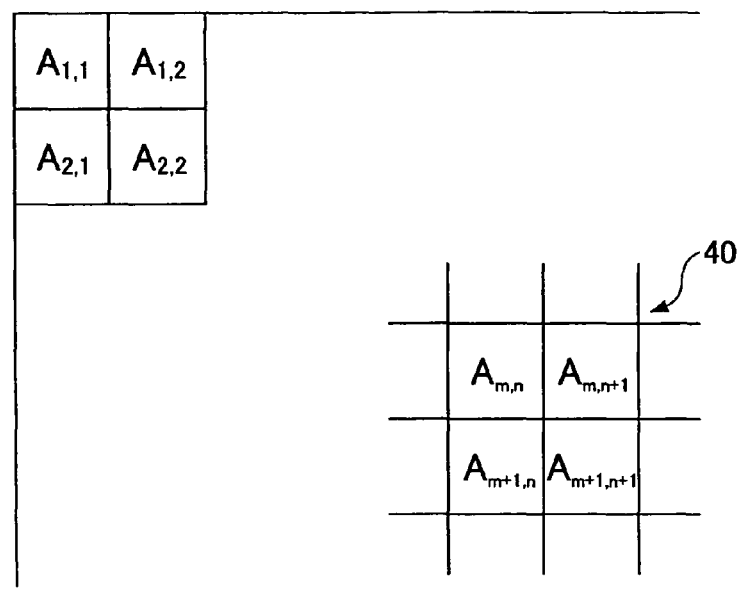
FIG. 8 is an illustrative drawing showing captured image data.

FIG. 8 through FIG. 15 are illustrative drawings showing image data in two-dimensional array format as image data is obtained at each process stage of the image enlargement process performed by the image processing apparatus 10. In FIG. 8, $A_{m,n}$ indicates a pixel value at coordinates (m, n) of an image before enlargement according to the present invention is performed. A partial image 40 is cut out from the captured image data shown in FIG. 8, thereby producing the cutout partial image shown in FIG. 9. The cutout partial image is comprised of pixel values $A_{m,n}$, $A_{m,n+1}$, $A_{m+1,n}$, and $A_{m+1,n+1}$.

Figure 9:
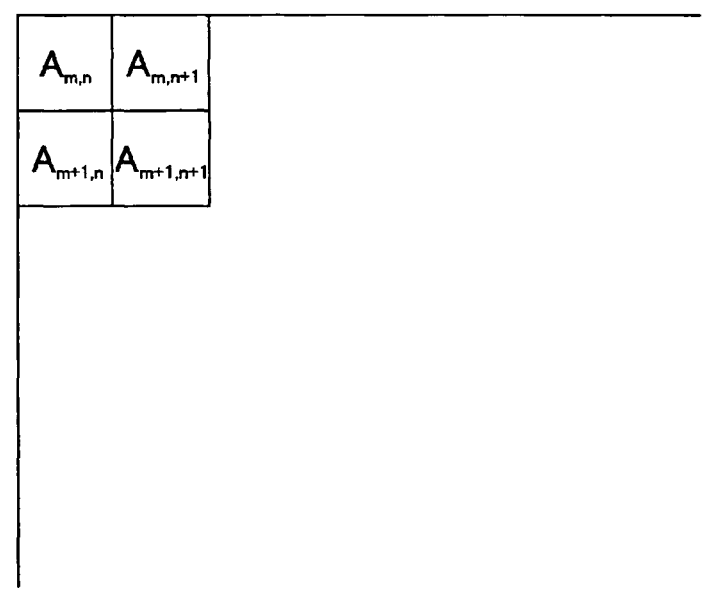
FIG. 9 is an illustrative drawing showing cutout image data.

The cutout partial image shown in FIG. 9 is enlarged four times in the horizontal direction, for example, by the horizontal enlargement unit 21 shown in FIG. 3. When nearest neighbor interpolation is employed, four-times enlargement is achieved by repeating the same pixel value four times. FIG. 10 illustrates an image after such horizontal enlargement. As shown in FIG. 10, the same pixel value is repeated four times for each pixel value in the horizontal direction. The data of each horizontal line is successively stored in the line buffer 22 shown in FIG. 3.

The pixel values stored in the line buffer 22 are repeated in the vertical direction by the vertical enlargement unit 23 shown in FIG. 3, thereby performing vertical enlargement. FIG. 11 illustrates an image after such vertical enlargement. As shown in FIG. 11, the same pixel value is repeated four times for each pixel value in the vertical direction.

Figure 12:
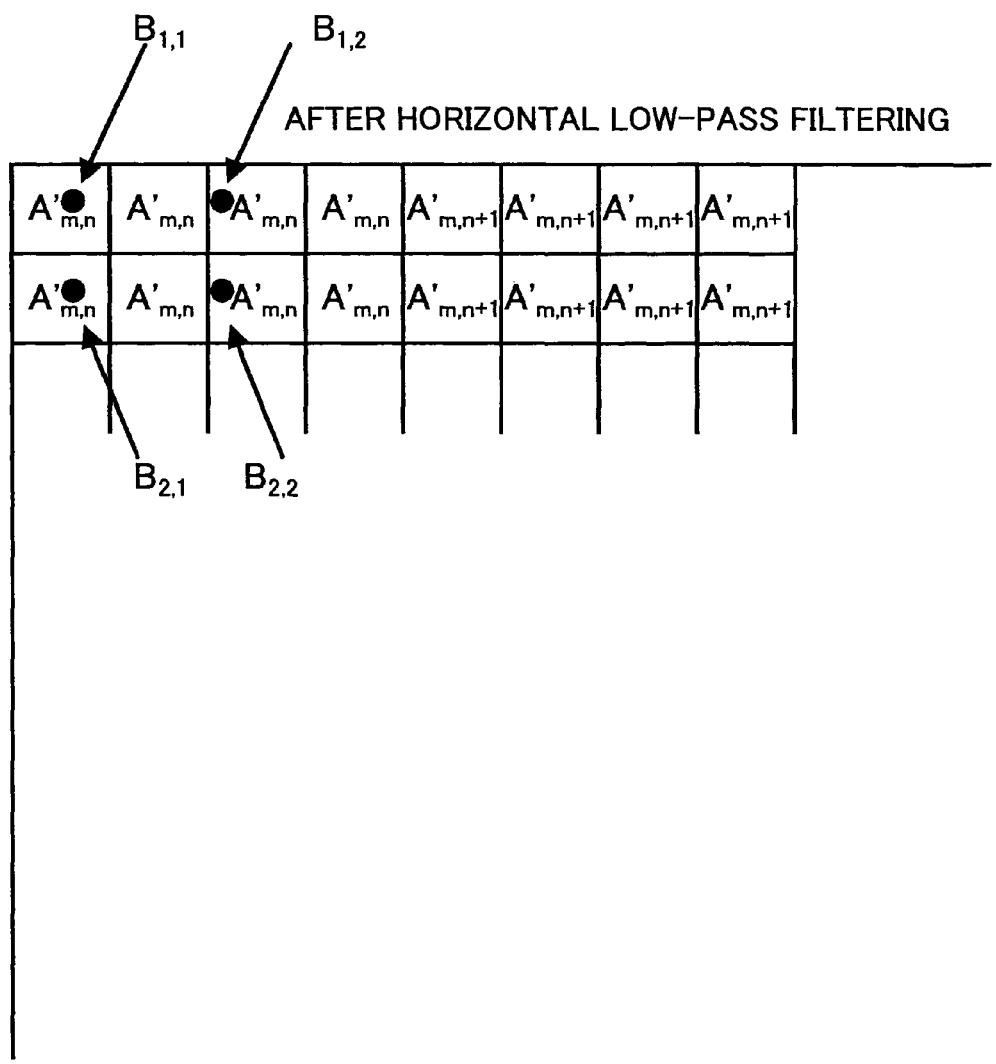
FIG. 12 is an illustrative drawing showing image data after horizontal low-pass filtering.

The horizontal low-pass filter 31 shown in FIG. 3 then performs low-pass filtering horizontally on the vertically enlarged image shown in FIG. 11. FIG. 12 illustrates the image after such horizontal low-pass filtering. Since pixel values are modified by the low-pass filtering, the modified pixel values are shown as A' in FIG. 12. Although illustration is omitted with respect to the third line onwards, data for eight lines are in existence in the vertical direction in the same manner as in FIG. 11.

Solid circles shown in FIG. 12 indicate the pixel positions (pixel coordinates) of a reduced image that is to be obtained by applying horizontal reduction to the image after the horizontal low-pass filtering as described above. In order to obtain pixel values $B_{1,1}$, $B_{1,2}$, . . . , and so on at the coordinates corresponding to these solid circles, the horizontal reduction unit 32 shown in FIG. 3 employs an interpolation scheme such as bilinear interpolation or bicubic interpolation. Namely, a predetermined interpolation function is computed based on the values of pixels arranged in the horizontal direction so as to obtain a pixel value at the position corresponding to a given solid circle.

Figure 13:
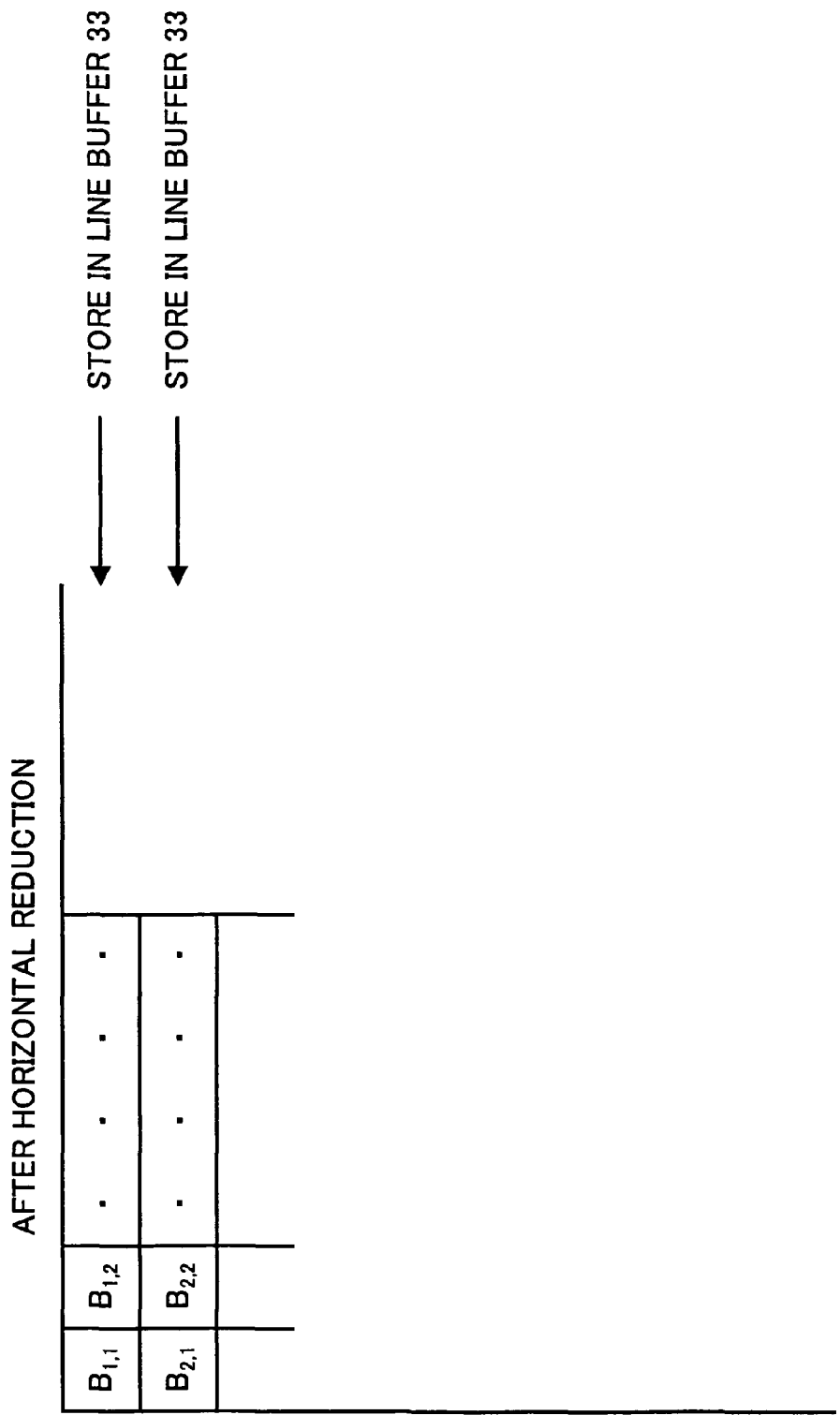
FIG. 13 is an illustrative drawing showing horizontally reduced image data.

FIG. 13 is an illustrative drawing showing a horizontally reduced image output from the horizontal reduction unit 32. The data of each horizontal line are successively stored in the line buffer 33 shown in FIG. 3.

Figure 14:
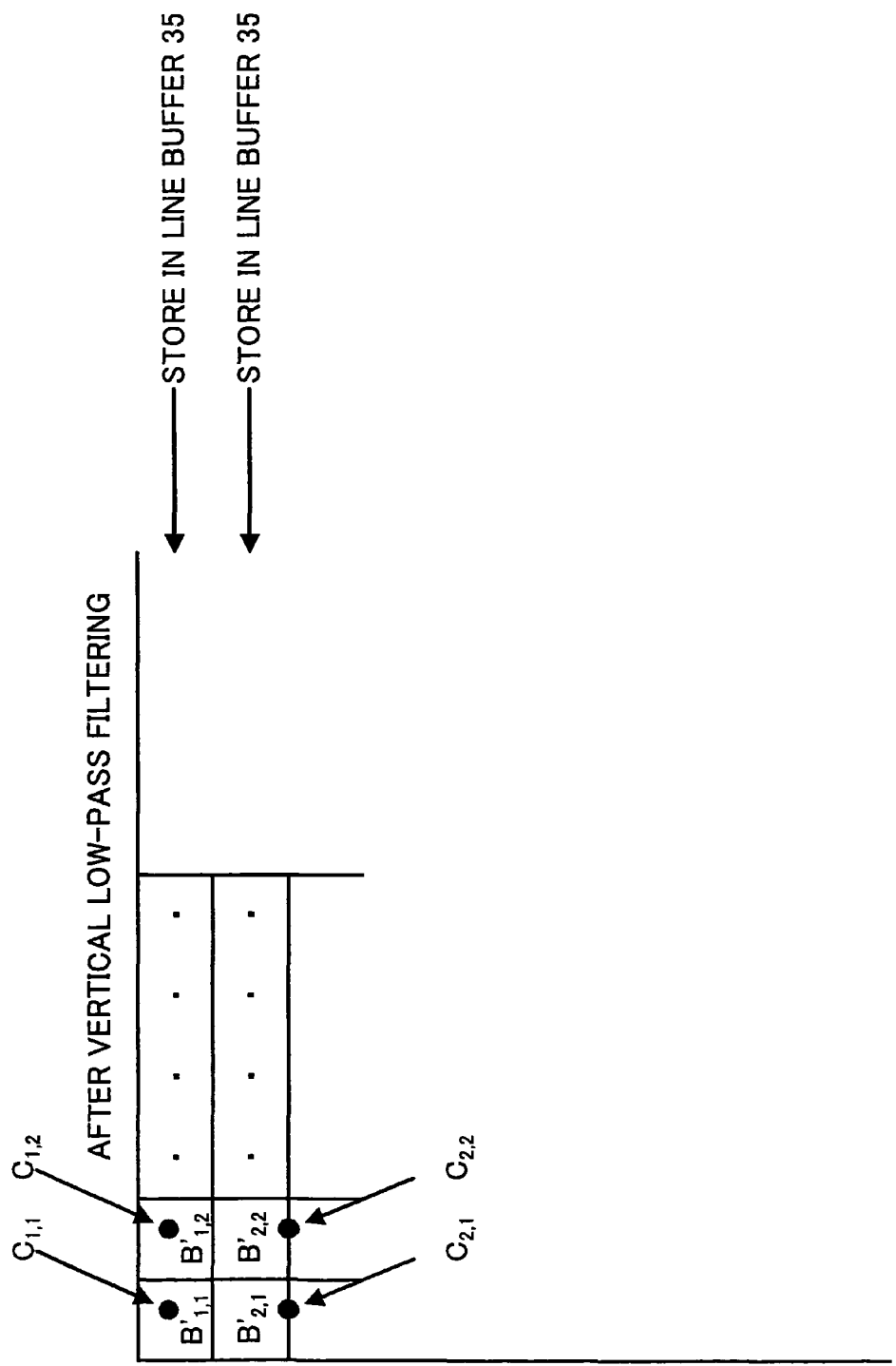
FIG. 14 is an illustrative drawing showing image data after vertical low-pass filtering.

The vertical low-pass filter 34 shown in FIG. 3 then performs low-pass filtering vertically on the pixel values stored in the line buffer 33. FIG. 14 illustrates the image after such vertical low-pass filtering. Since pixel values are modified by the low-pass filtering, the modified pixel values are shown as B' in FIG. 14. Although illustration is omitted with respect to the third line onwards, data for eight lines are in existence in the vertical direction in the same manner as in FIG. 11. The data of each horizontal line shown in FIG. 14 are successively stored in the line buffer 35 shown in FIG. 3.

Figure 15:
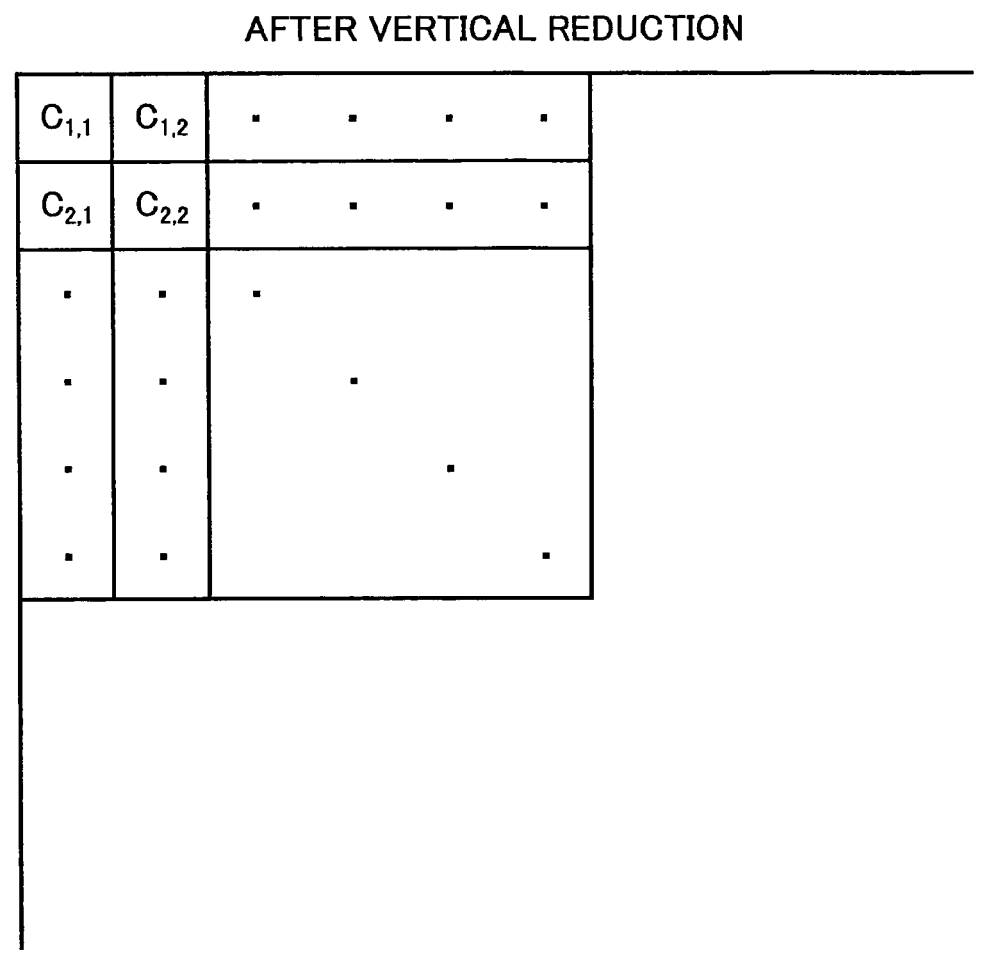

Solid circles shown in FIG. 14 indicate the pixel positions (pixel coordinates) of a reduced image that is to be obtained by applying vertical reduction to the image after the vertical low-pass filtering as described above. In order to obtain pixel values $C_{1,1}$, $C_{1,2}$, . . . , and so on at the coordinates corresponding to these solid circles, the vertical reduction unit 36 shown in FIG. 3 employs an interpolation scheme such as bilinear interpolation or bicubic interpolation. Namely, a predetermined interpolation function is computed based on the values of pixels arranged in the vertical direction stored in the line buffer 35 so as to obtain a pixel value at the position corresponding to a given solid circle. As a result, a vertically reduced image as shown in FIG. 15 is obtained.

Figure 16B:
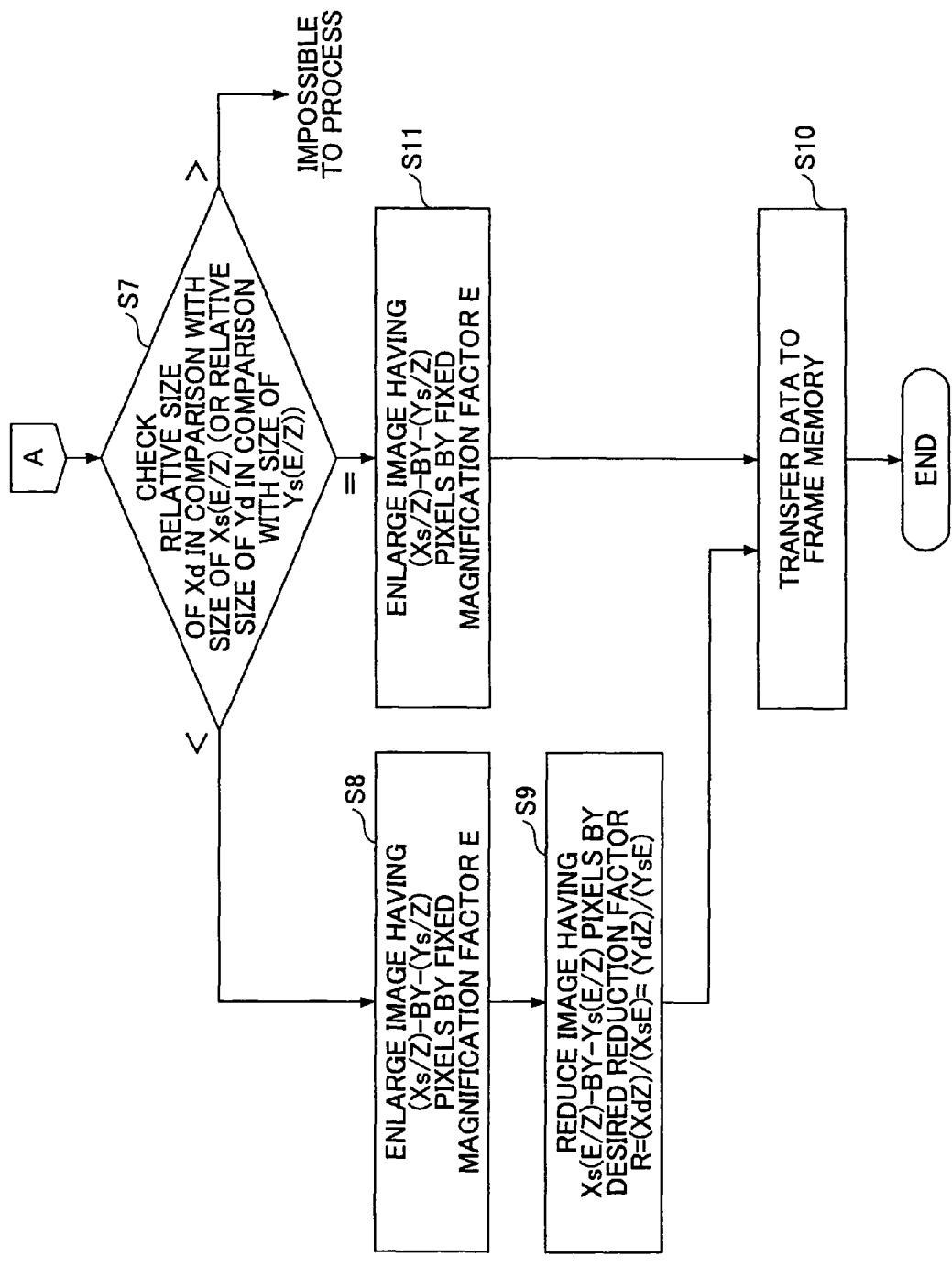

FIGS. 16A and 16B are flowcharts showing the procedure of image cutout and image enlargement/reduction process according to the present invention. In this procedure, the size of the image captured by the image sensor 11 is denoted as Xs-by-Ys pixels, the size of the image stored in the memory 17 (frame memory) denoted as Xd-by-Yd pixels, the fixed magnification factor used by the image enlargement unit 14 denoted as E, and a selected reduction factor used by the image reduction unit 15 denoted as R. Further, it is assumed that the image sensor 11 is provided with a primary color filter. The portion that is cut out of the captured image is not necessarily defined by the same ratio for the vertical direction and the horizontal direction. The aspect ratio may be modified. In order to achieve various image processing effects, further, the fixed enlargement factor E and the selected reduction factor R may be broken down into horizontal factors Ex and Rx and vertical factors Ey and Ry, so that these factors can be set independently of each other.

At step S1 of FIG. 16A, an analog electrical signal obtained by the imaging device having the primary-color Bayer array by use of the image sensor 11 is converted into digital data. At step S2, the image interpolation unit 12 interpolates between the pixels of the Bayer-array digital data to convert the data into color data (YCbCr, RGB, or the like).

At step S3, an area is cut out of the captured image having Xs-by-Ys pixels, such that the cutout area is 1/Z times as large both vertically and horizontally (i.e., 1/Z: a ratio of the cutout area to the whole image). At step S4, a check is made as to the relative size of Xd in comparison with the size of Xs/Z (or as to the relative size of Yd in comparison with the size of Ys/Z).

If Xd is smaller than Xs/Z, the size of an image to be stored in memory at the end is smaller than the size of the cutout image. In this case, it suffices to perform only a reduction process. Accordingly, at step S5, the image having (Xs/Z)-by-(Ys/Z) pixels is reduced by a factor R equal to Xd(Z/Xs), i.e., Yd(Z/Ys). At next following step S6, the image data having Xd-by-Yd pixels obtained by the reduction process of step S5 is transferred to the frame memory for storage therein.

If Xd is equal to Xs/Z, the size of an image to be stored in memory at the end is the same as the size of the cutout image. In this case, there is no need to resize the cutout image. Accordingly, the procedure proceeds to step S6, at which the image data having Xd-by-Yd pixels obtained by the cutout process of step S3 is transferred to the frame memory for storage therein.

If Xd is larger than Xs/Z, the size of an image to be stored in memory at the end is larger than the size of the cutout image. In this case, there may be a need to use a combination of enlargement and reduction. Accordingly, at step S7 shown in FIG. 16B, a check is made as to the relative size of Xd in comparison with the size of Xs(E/Z) (or as to the relative size of Yd in comparison with the size of Ys(E/Z)).

If Xd is smaller than Xs(E/Z), the size of an image to be stored in memory at the end is smaller than E times (fixed magnification) the size of the cutout image. In this case, there is a need to perform both image enlargement and image reduction. Accordingly, at step S8, the image having (Xs/Z)-by-(Ys/Z) pixels is enlarged by the fixed magnification factor E. At next following step S9, the image having Xs(E/Z)-by-Ys(E/Z) pixels is reduced by a factor R that is equal to (XdZ)/(XsE), i.e., (YdZ)/(YsE). At next step S10, the image data having Xd-by-Yd pixels obtained by the reduction process of step S9 is transferred to the frame memory for storage therein.

If Xd is equal to Xs(E/Z), the size of an image to be stored in memory at the end is the same as E times (fixed magnification) the size of the cutout image. In this case, it suffices to perform only an enlargement. Accordingly, the procedure proceeds to step S11, at which the image having (Xs/Z)-by-(Ys/Z) pixels is enlarged by the fixed magnification factor E. Thereafter, at step S10, the image data having Xd-by-Yd pixels obtained by the enlargement process of step S11 is transferred to the frame memory for storage therein.

If Xd is larger than Xs(E/Z), the size of an image to be stored in memory at the end is larger than E times (fixed magnification) the size of the cutout image. In this case, the procedure is terminated as no proper processing can be performed. In this example, it is assumed that the fixed magnification factor E is the only one available magnification factor, and that no other integer magnification factor is available. Alternatively, provision may be made such that a plurality of integer magnification factors such as 2, 4, 8, ..., and so on are available, so that a desired magnification factor can be selected therefrom to perform proper enlargement.

In the following, a variation of the image processing apparatus according to the present invention will be described. The variation of the image processing apparatus according to the present invention is configured to reduce the size of a line memory (line buffer) necessary for the processing.

In imaging apparatuses such as digital cameras, the number of pixels in the solid-state imaging device such as a CCD or CMOS has been increasing in response to the user demand for images having higher definition. As the number of pixels per horizontal line increases, however, the size of a line memory (line buffer) necessary for the enlargement/reduction processing also increases, resulting in an increase in circuit size.

As was described in the background of the invention, the related-art digital zoom processing (resize processing) uses a color processor to perform an image cutout process on the output data of the image sensor, and temporarily stores the image data in a frame memory, followed by using a scaler provided as a separate module to perform enlargement or reduction. If the enlargement/reduction process is to be performed without using the frame memory as an intervening element, the line data successively supplied from the image sensor needs to be processed sequentially. Especially in the case of an enlargement process providing a desired magnification, a large number of line memories need to be provided as temporary buffers in the image processing circuit. The provision of a large number of line memories is not preferable from the viewpoint of circuit scale reduction.

The configuration in which the image data (intermediary data) prior to resizing is stored in a frame memory can reduce circuit size, but gives rise to a problem in that extra memory space is necessary to store the intermediary data. Further, since there is a need to access the frame memory a large number of times during the enlargement/reduction process, a problem arises in that the system bus ends up being occupied for a long period.

On the other hand, the image processing apparatus according to the present invention described above performs an enlargement process at integer magnification first, and, then, performs a reduction process at the magnification factor that can be arbitrarily set. The enlargement process at integer magnification using the nearest neighbor method is achievable by reading data stored in a line memory for one horizontal line repeatedly multiple times (i.e., by copying the data multiple times), so that there is only a need to provide a line memory for one horizontal line. Further, the reduction process can be achieved by using a smaller number of line memories than in the enlargement process. The combination of an enlargement process at integer magnification and a reduction process at arbitrary magnification as described above can achieve a resizing process (digital zoom) at desired magnification while reducing the size of line memories.

Even in the configuration of the image processing apparatus of the present invention, however, as the number of pixels per horizontal line increases due to the increase in the number of pixels in the solid-state imaging device, the size of a line memory for one horizontal line necessary for the integer-magnification enlargement process cannot be ignored any longer in the consideration of circuit implementation. Accordingly, it is desired to provide a configuration that can reduce the size of a line memory for one horizontal line necessary for the enlargement process at integer magnification.

Figure 17:
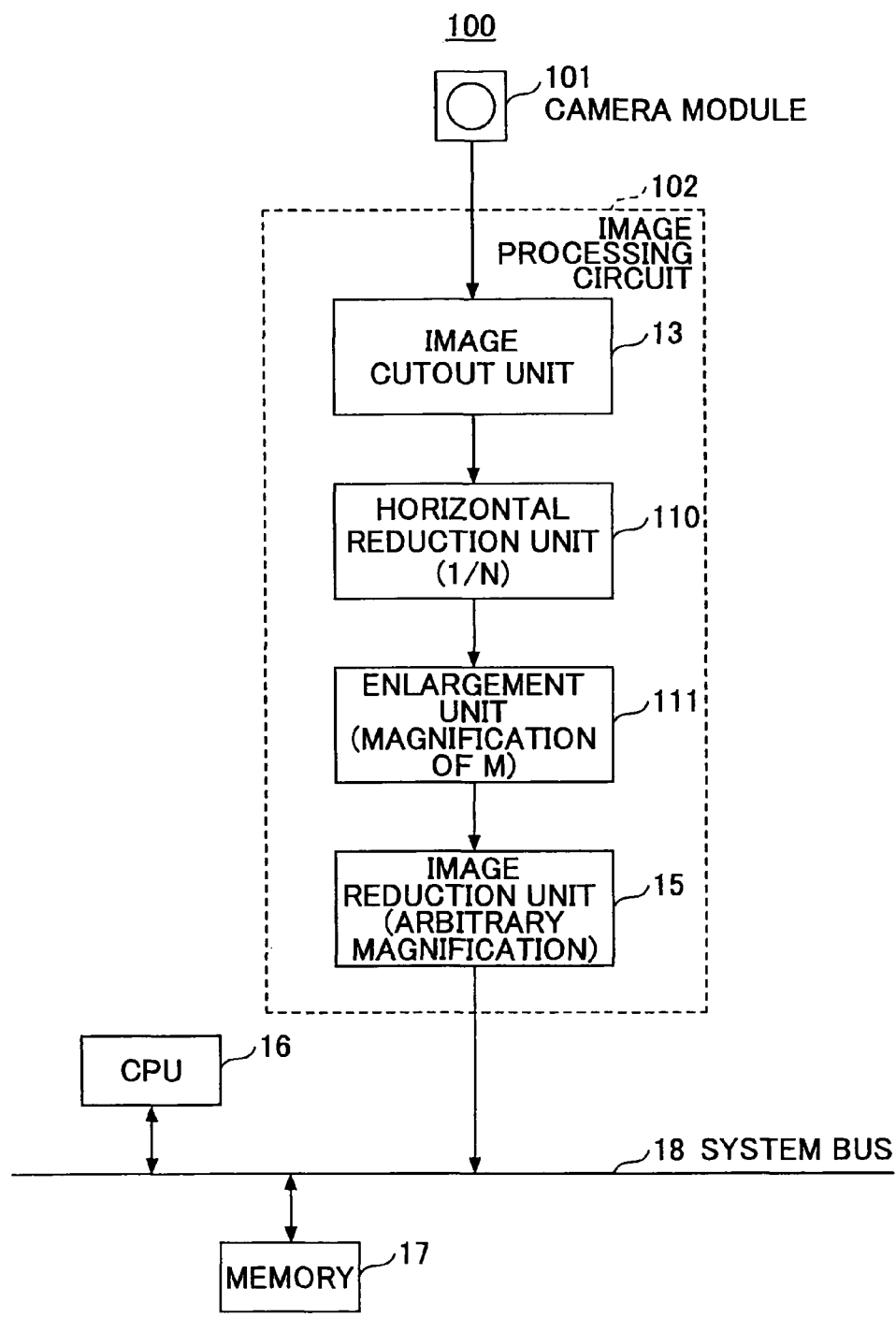
FIG. 17 is a drawing showing the configuration of a variation of the image processing apparatus according to the present invention.

FIG. 17 is a drawing showing the configuration of a variation of the image processing apparatus according to the present invention. In FIG. 17, the same elements as those of FIG. 1 are referred to by the same numerals, and a description thereof will be omitted.

An image processing apparatus 100 shown in FIG. 17 includes a camera module 101, the image cutout unit 13 for performing a cutout process, a horizontal reduction unit 110 for performing a 1/N-horizontal-reduction process, an enlargement unit 111 for performing a simplified enlargement process at a magnification factor of M (M: integer), the image reduction unit 15 for performing a reduction process at arbitrary magnification, the CPU 16, the memory 17, and the system bus 18. The image cutout unit 13, the horizontal reduction unit 110, the enlargement unit 111, and the image reduction unit 15 together constitute an image processing circuit 102.

The camera module 101 includes the image sensor 11 and the image interpolation unit 12 (see FIG. 1). The digital image data output from the camera module 101 is scan-line data that is scanned in a main scan direction, and is supplied (output) at predetermined speed.

The image processing apparatus 100 shown in FIG. 17 differs from the image processing apparatus 10 shown in FIG. 1 mainly in that the horizontal reduction unit 110 is inserted between the image cutout unit 13 and the enlargement unit 111. Further, the enlargement unit 111 is configured to use the nearest neighbor method to repeat the value of each pixel in the vertical direction (sub-scan direction) as many times as indicated by a vertical magnification factor and to use the nearest neighbor method to repeat the value of each pixel in the horizontal direction (main-scan direction) as many times as indicated by a horizontal magnification factor. Here, the vertical magnification factor and the horizontal magnification factor may be independent of each other as long as they are both integers.

The horizontal reduction unit 110 performs a 1/N-horizontal-reduction process to reduce the number of horizontal pixels to 1/N times as many pixels, so that the number of pixels in one horizontal line of the image supplied to the enlargement unit 111 becomes 1/N times as many. As a result, the circuit size of the line memory required in the enlargement unit 111 becomes 1/N times as large, resulting in a significant reduction in the circuit size of the enlargement unit 111.

Figure 18:
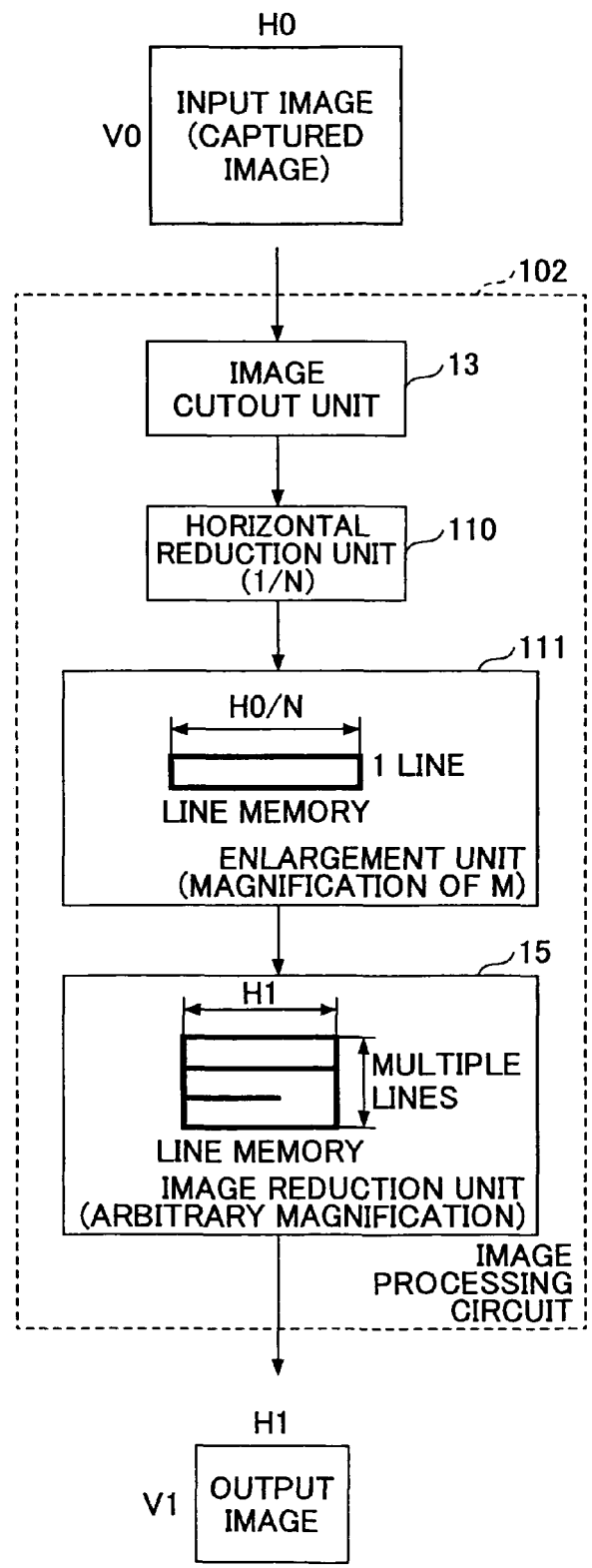
FIG. 18 is an illustrative drawing for explaining the operation of the image processing circuit shown in FIG. 17.

FIG. 18 is an illustrative drawing for explaining the operation of the image processing circuit 102. In FIG. 18, the image processing circuit 102 receives an input image that has V0 pixels in the vertical direction and H0 pixels in the horizontal direction, and produces an output image that has V1 pixels in the vertical direction and H1 pixels in the horizontal direction.

As the V0×H0 input image is supplied to the image processing circuit 102 as scan line data that is scanned in the main scan direction (horizontal direction), the image cutout unit 13 cuts out a specified portion of the input image. The image data cut out by the image cutout unit 13 is supplied as scan line data to the horizontal reduction unit 110. The maximum number of pixels in one horizontal line of the scan line data supplied to the horizontal reduction unit 110 is H0.

The horizontal reduction unit 110 sub-samples the pixels of the supplied data at predetermined rate or averages the data of a predetermined number of pixels, thereby producing image data in which the number of horizontal pixels is 1/N times as many. The maximum number of pixels in one horizontal line of the scan line data output from the horizontal reduction unit 110 is H0/N.

Based on the scan line data supplied from the horizontal reduction unit 110, the enlargement unit 111 performs an enlargement process at integer magnification by use of the nearest neighbor method. In so doing, the value of each pixel in one supplied horizontal line is repeated in the vertical direction (sub-scan direction) as many times as indicated by a vertical magnification factor, and the value of each pixel is repeated in the horizontal direction (main-scan direction) as many times as indicated by a horizontal magnification factor, thereby performing the enlargement process. It should be noted that the vertical magnification factor and the horizontal magnification factor may be independent of each other as long as they are integers. Accordingly, the enlargement unit 111 only requires one line memory for one horizontal line of the input image data as illustrated in FIG. 18. In this example, the maximum number of pixels in one horizontal line is H0/N, so that one line memory for H0/N pixels is all that is necessary.

The image data enlarged by the enlargement unit 111 is supplied to the image reduction unit 15. The image reduction unit 15 performs an image reduction process at a freely specified magnification factor with respect to the supplied image data. In so doing, if an interpolation method such as the bilinear method or bicubic method is used, multiple stages of line memories for a plurality of horizontal lines are necessary as illustrated in FIG. 18. Namely, the pixel values stored in these multiple stages of line memories are referred to in order to compute an interpolation value between lines according to a linear or third-order predetermined interpolation formula, thereby obtaining the pixel values of a horizontal line of a reduced image situated between the horizontal lines of the original image. The number of pixels in one stage of a line memory (i.e., one line memory) may be equal to the number of pixels in one horizontal line of the output image, and is H1 in this example.

In the case of the configuration shown in FIG. 18, as described above, the provision of the horizontal reduction unit 110 makes it possible to reduce the circuit size of the line memory of the enlargement unit 111 to 1/N times as large. As will later be described, the circuit size of the horizontal reduction unit 110 may be small. Accordingly, the effect of the reduction in circuit size made by reducing the size of the line memory having thousands of pixels to 1/N times as many is far greater than the effect of the increase in circuit size resulting from the addition of the horizontal reduction unit 110.

Figure 19:
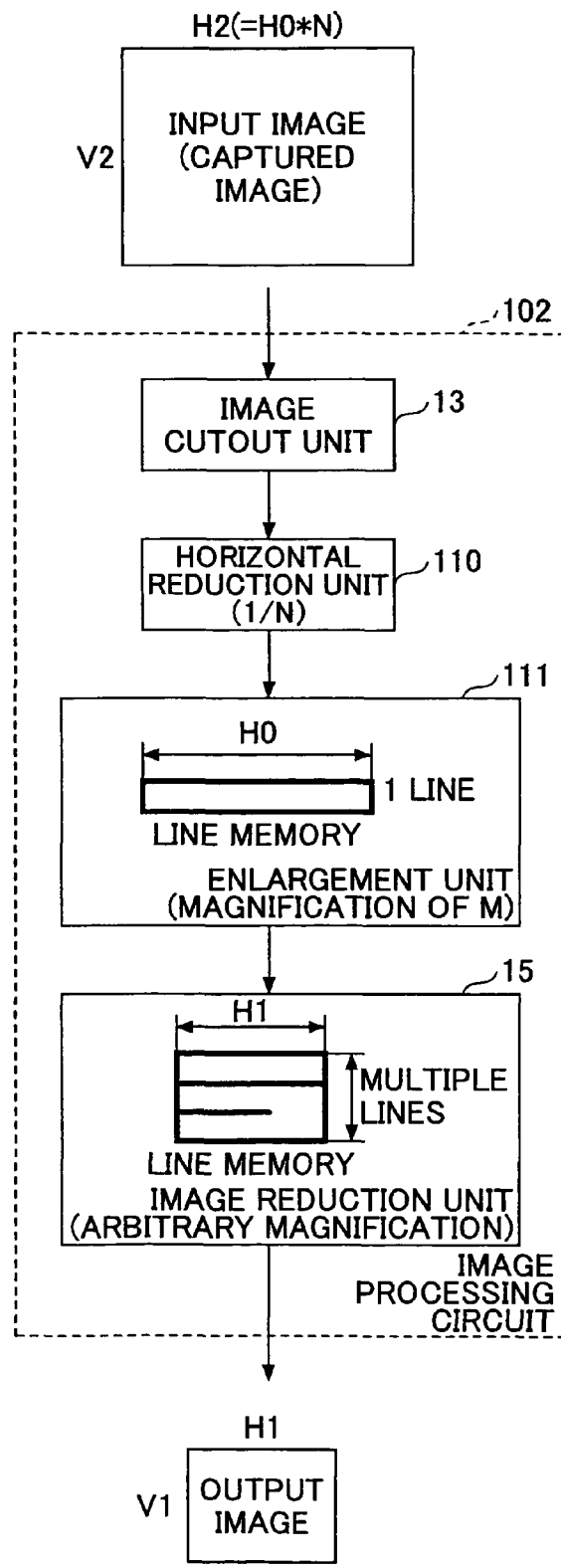
FIG. 19 is an illustrative drawing for explaining another example of the operation of the image processing apparatus shown in FIG. 17.

FIG. 19 is an illustrative drawing for explaining another example of the operation of the image processing apparatus 100 shown in FIG. 17. In FIG. 19, the image processing circuit 102 receives an input image that has V2 pixels in the vertical direction and H2 (=H0×N) pixels in the horizontal direction, and produces an output image that has V1 pixels in the vertical direction and H1 pixels in the horizontal direction.

The horizontal reduction unit 110 sub-samples at predetermined rate the pixels of data supplied from the image cutout unit 13 or averages the data of a predetermined number of pixels, thereby producing image data in which the number of horizontal pixels is 1/N times as many. In this example, the maximum number of pixels in one horizontal line of the scan line data output from the horizontal reduction unit 110 is H0 (=H2/N).

Based on the scan line data supplied from the horizontal reduction unit 110, the enlargement unit 111 performs an enlargement process at integer magnification by use of the nearest neighbor method. Accordingly, the enlargement unit 111 only requires one line memory for one horizontal line of the input image data as illustrated in FIG. 19. In this example, the maximum number of pixels in one horizontal line is H0, so that one line memory for H0 pixels is all that is necessary.

In the case of the configuration shown in FIG. 19, as described above, the horizontal reduction unit 110 is provided without reducing the size of the line memory of the enlargement unit 111, so that the size of an image being processed can be increased at least N times in the horizontal direction. Namely, with an existing image processing circuit, the addition of an extremely small circuit serving as the horizontal reduction unit 110 makes it possible to process an image that is N times as large in the horizontal direction as the image that is treatable by the original image processing circuit.

Figure 20:
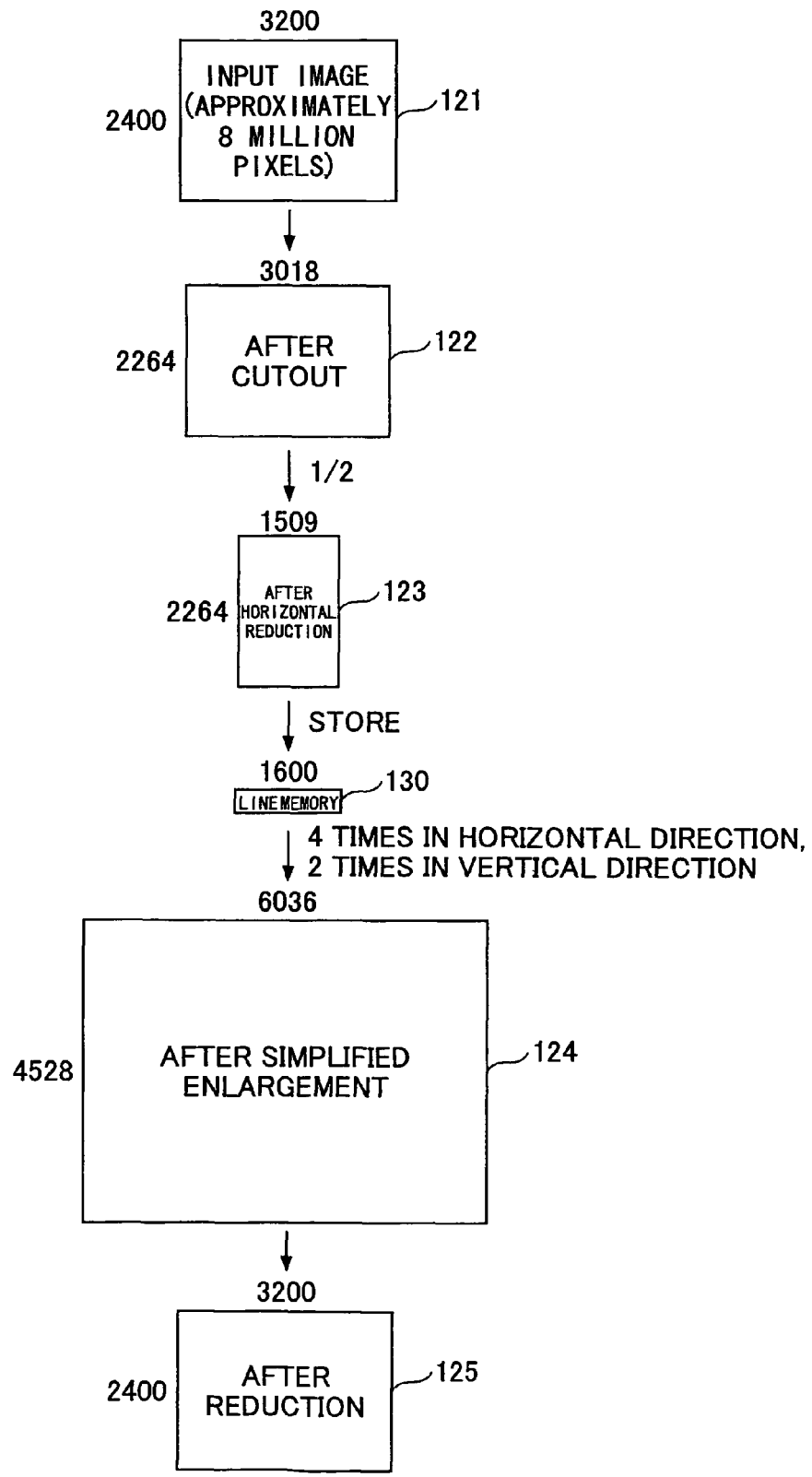
FIG. 20 is a drawing showing an example of image processing by the image processing apparatus shown in FIG. 17.

FIG. 20 is a drawing showing an example of image processing by the image processing apparatus 100. FIG. 20 illustrates a process that is performed when the zoom factor is 1.06 when gradually increasing the zoom factor from 1 in order to perform a digital zoom process at arbitrary magnification with respect to fine pixel size data (approximately 8 million pixels).

The size of an input image 121 is 3200×2400 pixels, and the size of a final output image 125 is also 3200×2400 pixels. First, an image cutout process is performed to cut out a portion 122 comprised of 3018×2264 pixels, which corresponds to an area that is 1/1.06 times larger in the vertical and horizontal directions than the input image 121. Next, a horizontal reduction process is performed to reduce the horizontal size of the cutout image 122 to ½ times the original size, thereby producing a horizontally reduced image 123 comprised of 1509×2264 pixels. Then, the line data of the horizontally reduced image 123 is successively stored in a line memory 130 of the enlargement unit 111 (see FIG. 17) in order to perform a simplified enlargement process at integer magnification. The provision of the horizontal reduction process described above makes it possible to transfer data even if the line memory 130 is that of the 2-million-pixel specification (i.e., a memory having 1600 pixels in one horizontal line). After this, the enlargement unit 111 performs an enlargement process to increase the image size 4-times in the horizontal direction and two times in the vertical direction, thereby generating an enlarged image 124 comprised of 6036×4528 pixels. Further, a reduction process for which an arbitrary magnification factor is settable is performed to reduce the enlarged image 124 to generate the final image 125 of 1.06-times zoom comprised of 3200×2400 pixels.

Figure 21:
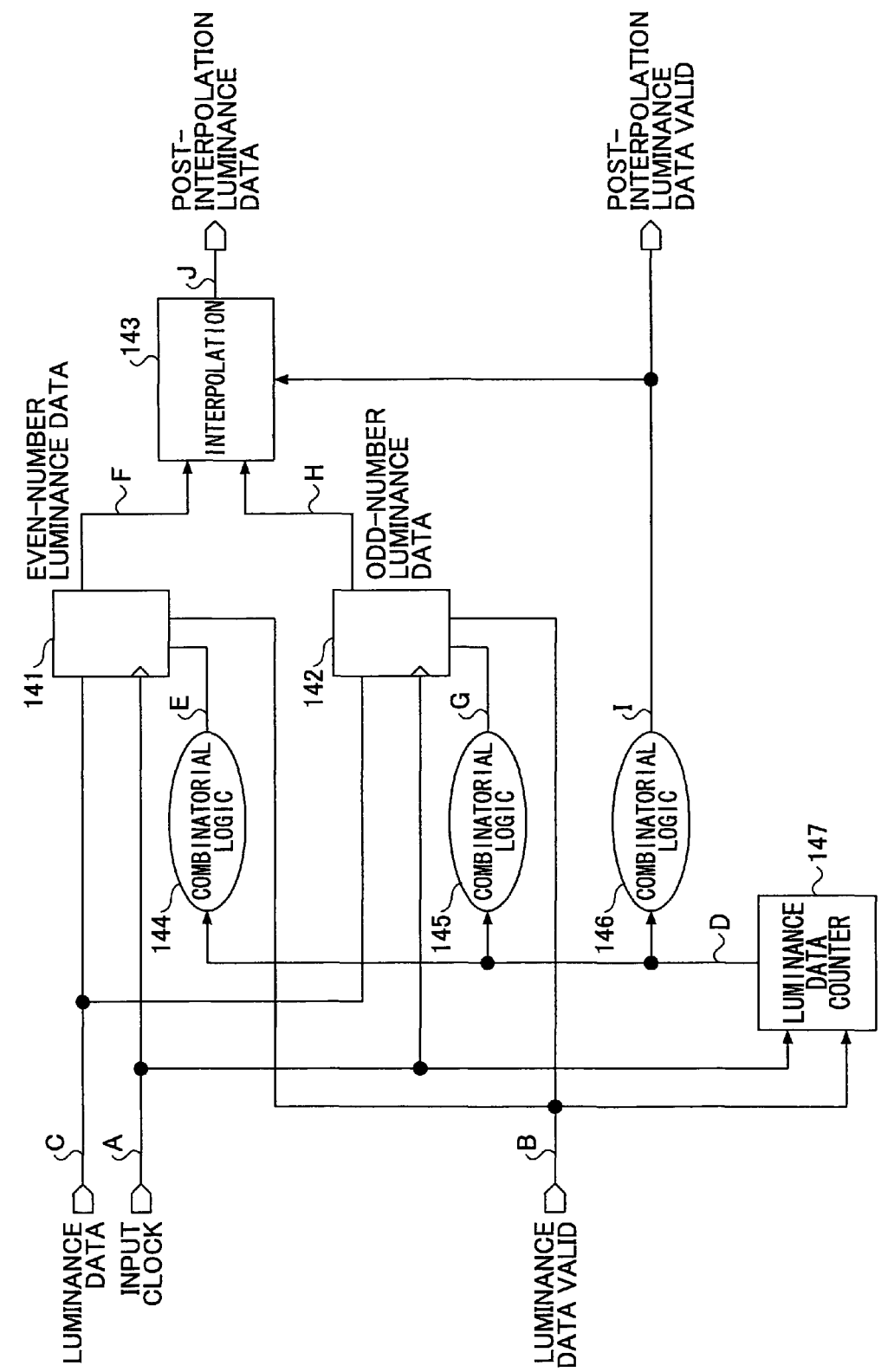
FIG. 21 is a drawing showing an example of the circuit configuration of the horizontal reduction unit.

FIG. 21 is a drawing showing an example of the circuit configuration of the horizontal reduction unit 110. The horizontal reduction unit 110 of FIG. 21 is a circuit that performs a ½-reduction process through sub-sampling that takes an average of two adjacent pixels, and includes a flip-flop 141, a flip-flop 142, an interpolation circuit 143, a first combinatorial logic circuit 144, a second combinatorial logic circuit 145, a third combinatorial logic circuit 146, and a luminance data counter 147. Image data generally includes chrominance data and luminance data. In FIG. 21, only the process for the luminance data is illustrated. It suffices to perform a similar process with respect to the chrominance data. The configuration that computes an average of two adjacent pixels shown in FIG. 21 is a non-limiting example, and the horizontal reduction unit 110 may alternatively perform sub-sampling by taking an average of N successive pixels to perform 1/N reduction process.

Luminance data is supplied to the flip-flop 141 and the flip-flop 142 in synchronization with an input clock. The flip-flops 141 and 142 load the value (luminance data) of an even-number pixel and the value of an odd-number pixel (luminance data), respectively, in response to the output of the first combinatorial logic circuit 144 and the output of the second combinatorial logic circuit 145, respectively, that are responsive to the count of the luminance data counter 147.

The interpolation circuit 143 computes an average between the value of the even-number pixel of luminance data supplied from the flip-flop 141 and the value of the odd-number pixel of luminance data supplied from the flip-flop 142, and outputs the computed value as luminance data after interpolation. The timing at which the interpolation circuit 143 outputs the averaged values is controlled based on the output of the third combinatorial logic circuit 146 responsive to the count of the luminance data counter 147, such that the averaged values are output at half the rate of the input clock.

It suffices for the interpolation circuit 143 to have such a configuration that two input values are added, and the result is shifted one bit to the right. Namely, the interpolation circuit 143 may be implemented by use of only an adder and a shift circuit. The circuit size of the horizontal reduction unit 110 can thus be made extremely small.

Figure 22:
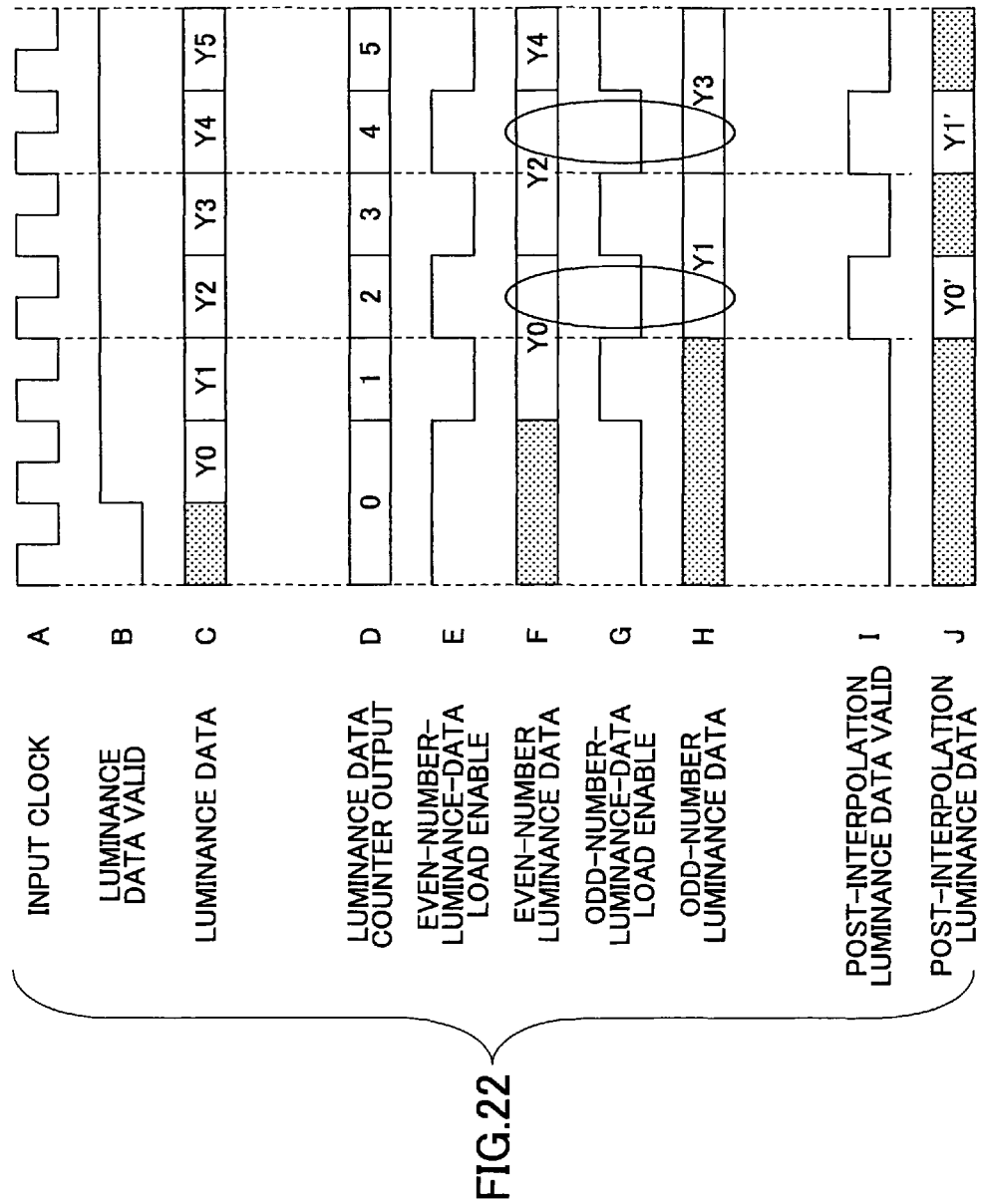
FIG. 22 is a timing chart for explaining the operation of the horizontal reduction unit shown in FIG. 21.

FIG. 22 is a timing chart for explaining the operation of the horizontal reduction unit 110 shown in FIG. 21. FIG. 22 illustrates an input clock A, a luminance data valid B, luminance data C, a luminance data counter output D, an even-number-luminance-data load enable E, an even-number luminance data F, an odd-number-luminance-data load enable G, an odd-number luminance data H, a post-interpolation luminance data valid I, and post-interpolation luminance data J. Each of these signals is shown with the circuit of FIG. 21.

The input clock A, the luminance data valid B, and the luminance data C are supplied to the horizontal reduction unit 110, and the post-interpolation luminance data valid I and the post-interpolation luminance data J are output from the horizontal reduction unit 110. All the signals exhibit changes in synchronization with the rising edges of the input clock A. The horizontal reduction rate is ½ as was described in connection with FIG. 21.

As the luminance data together with the luminance data valid signal B indicative of valid luminance data are supplied to the horizontal reduction unit 110, the luminance data counter 147 counts the valid luminance data. The count obtained in this manner is shown in FIG. 22 as the luminance data counter output D.

The even-number-luminance-data load enable E that is an enable input into the flip-flop 141 becomes HIGH during the period in which the luminance data counter output D indicates even numbers. The odd-number-luminance-data load enable G that is an enable input into the flip-flop 142 becomes HIGH during the period in which the luminance data counter output D indicates odd numbers. With this provision, even-number data is stored in the flip-flop 141, and odd-number data is stored in the flip-flop 142. The output of the flip-flop 141 and the output of the flip-flop 142 are illustrated as the even-number luminance data F and the odd-number luminance data H in FIG. 22, respectively.

The post-interpolation luminance data valid I is supplied to the interpolation circuit 143, and becomes HIGH during the periods in which the luminance data counter output D indicates even numbers. The interpolation circuit 143 computes an average of the even-number luminance data F and the odd-number luminance data H for provision as an output during the periods in which the post-interpolation luminance data valid I is HIGH. The average value computed and output in this manner is illustrated in FIG. 22 as the post-interpolation luminance data J.

Further, the present invention is not limited to these embodiments, but various variations and modifications may be made without departing from the scope of the present invention.

What is claimed is:

1. An image processing apparatus, comprising:
a data supply node to receive line data scanned in a main scan direction of an image;
an image enlargement unit coupled to the data supply node to apply to the line data an enlargement process for enlarging the image by an enlargement factor equal to an integer so as to produce enlarged data at an output node;
an image reduction unit coupled to the output node of the image enlargement unit to apply to the enlarged data a reduction process for reducing the enlarged image by a desired reduction factor so as to produce reduced data at an output node;
an image sensor to output image data to an output node;
an image cutout unit coupled between the output node of the image sensor and the data supply node to supply, as the line data to the data supply node, data corresponding to a portion cut out of the image data; and
a system bus coupled to the output node of the image reduction unit; and a frame memory coupled to the system bus to store the reduced data,
wherein the image enlargement unit is coupled to the output node of the image cutout unit without having an intervening frame memory,
and wherein scan-line data scanned in the main scan direction is output from the image sensor at a given speed, and the scan-line data is input into and output from the image cutout unit, the image enlargement unit, and the image reduction unit at the same speed as the given speed.

2. The image processing apparatus as claimed in claim 1, wherein the enlargement factor of the enlargement process performed by the image enlargement unit is at least one fixed magnification factor, and the reduction factor of the reduction process performed by the image reduction unit is a freely settable magnification factor.

3. The image processing apparatus as claimed in claim 1, wherein the enlargement process performed by the image enlargement unit is enlargement based on nearest neighbor interpolation, and wherein the image reduction unit includes a filtering unit configured to apply low-pass filtering to the enlarged data.

4. The image processing apparatus as claimed in claim 3, wherein the reduction process performed by the image reduction unit is reduction based on bilinear interpolation or bicubic interpolation.

5. The image processing apparatus as claimed in claim 1, wherein the image reduction unit is coupled to the output node of the image enlargement unit without having an intervening frame memory.

6. The image processing apparatus as claimed in claim 1, further comprising a horizontal reduction unit configured to receive image data as an input and to supply, as the line data to the data supply node, data obtained by applying a horizontal reduction process for reducing the image data in a horizontal direction.

7. The image processing apparatus as claimed in claim 6, wherein the image enlargement unit is configured to enlarge the image by copying each pixel value by use of a nearest neighbor method.

8. The image processing apparatus as claimed in claim 6, wherein the horizontal reduction unit is configured to perform the horizontal reduction process through sub-sampling that takes an average of a plurality of pixels of the image data.

9. The image processing apparatus as claimed in claim 8, wherein the horizontal reduction unit is configured to compute the average by use of an adder and a bit-shift circuit.

10. An image processing method for use in an image processing apparatus including an image sensor, a system bus, and a memory, comprising:
outputting image data of an original image from the image sensor at predetermined data speed;
cutting out a portion of the original image as a partial image;
receiving line data of the partial image scanned in a main scan direction of the partial image;
applying to the line data an enlargement process for enlarging the partial image by an enlargement factor equal to an integer so as to produce enlarged data; and
applying to the enlarged data a reduction process for reducing the enlarged image by a desired reduction factor so as to produce reduced data;
storing the reduced data in the memory through the system bus,
wherein the above are performed as a series of processes that match the data speed, and
wherein the enlargement process is performed on the line data of the partial image without using an intervening frame memory for storing the line data of the partial image,
and wherein scan-line data scanned in the main scan direction is output from the image sensor at a given speed, and the scan-line data is input and output during the cutting out of a portion of the original image, the enlargement process, and the reduction process at the same speed as the given speed.

* * * * *

UNITED STATES PATENT AND TRADEMARK OFFICE
CERTIFICATE OF CORRECTION

| | | |
|---|---|---|
| PATENT NO. | : 8,630,511 B2 | Page 1 of 1 |
| APPLICATION NO. | : 11/520778 | |
| DATED | : January 14, 2014 | |
| INVENTOR(S) | : Kuroki et al. | |

It is certified that error appears in the above-identified patent and that said Letters Patent is hereby corrected as shown below:

In the Specification:

Column 1, line 11, "Application No. 2005-1268216" should read --Application No. 2005-268216--.

Signed and Sealed this
Third Day of June, 2014

Michelle K. Lee
*Deputy Director of the United States Patent and Trademark Office*